United States Patent
Blanco et al.

(10) Patent No.: US 10,055,452 B2
(45) Date of Patent: Aug. 21, 2018

(54) MOST LIKELY CLASSIFICATION CODE

(71) Applicant: The Travelers Indemnity Company, Hartford, CT (US)

(72) Inventors: Monica N. Blanco, Plantsville, CT (US); Hayden Crumrine, Bristol, CT (US); Brett Mortimer, Bloomfield, CT (US); Yvette Nieves, Windsor, CT (US); Frederica K. Werkheiser, Parkton, MD (US)

(73) Assignee: THE TRAVELERS INDEMNITY COMPANY, Hartford, CT (US)

( * ) Notice: Subject to any disclaimer, the term of this patent is extended or adjusted under 35 U.S.C. 154(b) by 459 days.

(21) Appl. No.: 14/528,006

(22) Filed: Oct. 30, 2014

(65) Prior Publication Data

US 2016/0125025 A1    May 5, 2016

(51) Int. Cl.
*G06F 17/30*   (2006.01)
*G06F 3/0484*  (2013.01)

(52) U.S. Cl.
CPC .... *G06F 17/30392* (2013.01); *G06F 3/04842* (2013.01); *G06F 17/30522* (2013.01); *G06F 17/30554* (2013.01)

(58) Field of Classification Search
None
See application file for complete search history.

(56) References Cited

U.S. PATENT DOCUMENTS

| | | | |
|---|---|---|---|
| 6,216,130 B1 | 4/2001 | Hougaard et al. | |
| 6,604,080 B1 | 8/2003 | Kern | |
| 8,626,538 B1 * | 1/2014 | Kilpatrick, II | G06Q 40/08 705/4 |
| 8,712,807 B2 | 4/2014 | Walker et al. | |
| 8,719,063 B1 | 5/2014 | Wade et al. | |
| 2002/0165805 A1 | 11/2002 | Varga et al. | |

(Continued)

OTHER PUBLICATIONS

"The Hartford Introduces Web-Based Quoting and Submission Tool for Small Commercial Insurance" URL: http://hig.client.shareholder.com/releasedetail.cfm?releaseid=209383 retrieved from the Internet: Oct. 20, 2014. 2 pages.

(Continued)

*Primary Examiner* — Richard Bowen
(74) *Attorney, Agent, or Firm* — Cantor Colburn LLP

(57) ABSTRACT

A system for determining a most likely classification code is provided. The system includes a processing device and a memory device in communication with the processing device. The memory device stores instructions that when executed by the processing device may result in receiving a geographic location indicator associated with a plurality of geographic location-based rules stored in a database. A business-type classification selection can also be received. The database may be queried to retrieve a data set from the plurality of geographic location-based rules that matches the geographic location indicator and the business-type classification selection. The data set may be received in response to querying the database and can be formatted as a list including one or more entries. Each of the entries may include a numeric classification code and a corresponding description. The list may be output as selectable instances of the one or more entries.

22 Claims, 14 Drawing Sheets

(56) References Cited

U.S. PATENT DOCUMENTS

| | | | |
|---|---|---|---|
| 2003/0179236 A1* | 9/2003 | Good | G06F 17/30707 715/764 |
| 2003/0229581 A1 | 12/2003 | Green et al. | |
| 2005/0081152 A1* | 4/2005 | Commarford | G06F 9/4446 715/705 |
| 2005/0144114 A1 | 6/2005 | Ruggieri et al. | |
| 2005/0154617 A1 | 7/2005 | Ruggieri et al. | |
| 2008/0059220 A1 | 3/2008 | Roth et al. | |
| 2008/0114789 A1* | 5/2008 | Wysham | G06F 17/30522 |
| 2008/0140616 A1 | 6/2008 | Encina et al. | |
| 2009/0228301 A1* | 9/2009 | Youngblood | G06Q 40/08 705/3 |
| 2009/0300046 A1 | 12/2009 | Abouyounes | |
| 2010/0094666 A1* | 4/2010 | Pendergrass | G06Q 10/1057 705/4 |
| 2010/0154005 A1* | 6/2010 | Baxter | G06F 17/30038 725/56 |
| 2010/0169365 A1 | 7/2010 | Chupp et al. | |
| 2011/0010378 A1* | 1/2011 | Dukes | G06F 17/30554 707/759 |
| 2011/0077977 A1 | 3/2011 | Collins et al. | |
| 2011/0161182 A1 | 6/2011 | Racco | |
| 2012/0158289 A1 | 6/2012 | Brush et al. | |
| 2013/0290200 A1 | 10/2013 | Singhal et al. | |
| 2014/0039323 A1* | 2/2014 | Spector | A61B 1/00009 600/476 |
| 2014/0067737 A1 | 3/2014 | Kapadia et al. | |
| 2014/0173684 A1 | 6/2014 | McQuay et al. | |
| 2014/0207789 A1 | 7/2014 | Lee et al. | |
| 2014/0244309 A1* | 8/2014 | Francois | G06F 19/322 705/3 |
| 2014/0279599 A1 | 9/2014 | Bruno et al. | |
| 2014/0330594 A1* | 11/2014 | Roberts | G06Q 40/08 705/4 |
| 2015/0032479 A1 | 1/2015 | Schembari et al. | |
| 2015/0071268 A1 | 3/2015 | Kennedy et al. | |
| 2015/0186467 A1* | 7/2015 | Voonna | G06F 17/30997 707/736 |
| 2015/0331903 A1* | 11/2015 | Blanco | G06F 3/0484 707/766 |
| 2016/0125024 A1 | 5/2016 | Blanco et al. | |
| 2016/0125422 A1 | 5/2016 | Blanco et al. | |

OTHER PUBLICATIONS

U.S. Appl. No. 14/280,794 Non-Final Office Action dated Jul. 28, 2016, 17 pages.

Insurance Requirements & Regulations by State; Advanced Insurance Management LLC "AIM".; Jun. 11, 2005, 35 pages.

U.S. Appl. No. 14/527,964 Non-Final Office Action dated Jan. 20, 2017, 62 pages.

U.S. Appl. No. 14/280,794 Notice of Allowance dated Dec. 7, 2016, 11 pages.

U.S. Appl. No. 14/527,964 Final Office Action dated Oct. 26, 2017, 18 pages.

U.S. Appl. No. 14/527,964 Non-Final Office Action dated Jun. 15, 2018, 25 pages.

* cited by examiner

Policy Information — 404

- *Policy Effective Date: 12/05/2013 — 402, 406
- Sub-Agent Code — 410
- *Policy Expiration Date: 12/05/2014 — 408
- Policy Number: 005S890520 — 412, Search

701

Classification — 416

- Business Type: Bakery
- Most Likely Class Code
- Segment: STORE — 702
- Code: 5461 — 704
- Description: RETAIL BAKERIES — 706, 708, 710

Insured Information — 418

- FEIN — 421
- *Legal Entity — 420
- *Primary Named Insured — 422
- C/O or Attn — 424
- Country: United States — 426
- *Mailing Address 1: 4737 E BELL RD — 428
- Mailing Address 2
- City: PHOENIX — 430
- State: AZ — 432, 436
- Zip: 85032 — 434

700

MOST LIKELY CLASSIFICATION CODE

BACKGROUND

In industries such as banking, finance, and insurance, proper classification of data is critical to comply with a number of government regulations and to accurately characterize expected risks. The highly regulated yet dynamic nature of classification codes can make it challenging for professionals to stay current on exact numeric codes and associated definitions. This can result in a time consuming process of frequently researching, locating, and identifying proper classification codes using a number of industry sites and/or publications. As one example, when creating a new insurance policy for a business, an insurance professional can seek out and manually input the proper classification codes when entering various attributes that describe risks and/or operations of the business. There are typically multiple levels of classification that must be navigated through to accurately characterize the business customer. The risk of error or misclassification increases where multiple systems for classification code lookup are used and free-form manual data entry is performed.

When manual searches of various data sources are performed to determine classification codes, knowledge of contents and formatting of the data sources may be required. Data provided by different sources can use similar terms or ambiguous terms that may not be readily apparent without performing further searches to confirm that the code definitions are accurately understood. For example, the North American Industry Classification System (NAICS) provides a method for describing industries to which various organizations belong but includes many similar classifications such as: 445291 for Baked Goods Stores, 311811 for Retail Bakeries, 311812 for Commercial Bakeries, 311821 for Cookie and Cracker Manufacturing, 311919 for Other Snack Food Manufacturing, etc. Multiple coding schemes may be used for classifying businesses and types of operations performed by the businesses. If multiple individual searches of various databases occur across a computing network, then computer system and network performance is typically degraded, as each search requires processing resource time, network bandwidth, and temporary storage space to capture the results of multiple queries. Repeated data entry and numerous searches across multiple computer systems to retrieve similar and sometimes redundant information can reduce overall computer system and network performance.

In addition to searches for classifications that identify a business type, different job types for a specific business type may also need to be searched to accurately classify data when preparing an insurance policy. Job type code definitions can vary depending upon geographic location. Classification can be further complicated by the assignment of different classification codes for similar data depending upon geographic location. For example, in the insurance industry, workers compensation classification codes can be three or four digits as assigned by the National Council on Compensation Insurance (NCCI) or state rating bureaus. In the context of workers compensation insurance, over 700 unique classification codes exist, which serve as the basis for pricing and underwriting of workers compensation insurance policies. The classification codes help to differentiate between the various job duties or "scope of work performed" by employees.

Classification codes that are regulated by industry and geographic location are subject to change as time passes. Regulating bodies need not coordinate updates relative to each other, leading to any number of changes at any time throughout the year. The highly regulated yet dynamic nature of classification codes can make it challenging for professionals to stay current on exact numeric codes and associated definitions. This can result in a time consuming process of frequently researching, locating, and identifying proper classification codes using a number of industry sites and/or publications. As one example, when creating a new insurance policy, an insurance professional can seek out and manually input the proper classification codes when entering various attributes that describe risks and/or operations of the policy applicant. Multiple searches for both business type classification and job code classification can result in increased network and processing system bandwidth consumption and may further consume memory resources as multiple search results accumulate.

BRIEF DESCRIPTION OF THE DRAWINGS

The subject matter which is regarded as the invention is particularly pointed out and distinctly claimed in the claims at the conclusion of the specification. The features and advantages of the invention are apparent from the following detailed description taken in conjunction with the accompanying drawings in which:

FIG. 4 depicts an interactive user display and user input interface according to some embodiments of the present invention;

FIG. 7 depicts another example of an interactive user display and user input interface according to some embodiments of the present invention;

DETAILED DESCRIPTION

According to an embodiment, a system for selection of a most likely classification code associated with a business type and geographic location-based rules is provided as part of a data entry and analysis system. The system may be used in searching data from multiple sources as part of a classification and selection process. In order to improve computing system performance and throughput, a classification determination is performed using a classification code selection application that supports a number of search types and returns an extended data set to assist in guiding a user in confirming selection accuracy and reducing the need for multiple additional queries. As one example, the classification code selection application can be used as part of an insurance rate/quote/issue system that gathers policy information, performs underwriting and eligibility analysis, determines one or more associated classification codes, and generates a quotation for an insurance policy. The classification code selection application can suggest a most likely classification code based on geographic location-based rules, such as a job classification code, in combination with business-type classification data. The classification code selection application can access the geographic location-based rules while performing a search against the business-type classification data during the insurance rate/quote/issue process to provide suggested data, such as job code classification, and prefill form fields as part of the same transaction while the relevant data are locally available in computer system memory to reduce the number or volume of network and data storage system accesses, thereby improving overall computer system performance and throughput.

In an exemplary embodiment, a classification code selection application is provided that simplifies a classification process by integrating numerous business classification data sets and geographic location-based rules with a search interface which supports rapid lookup operations based on a variety of search options. The classification process can be used for insurance quotation generation, financial systems, legal services, banking services, medical record management, shipping classification, economic data classification, or any such application where business classification data are organized and referenced with respect to classification codes and geographic location-based rules. Accordingly, although a detailed example is described herein in reference to an insurance rate/quote/issue process, the classification code selection application may be generally applicable to any number of industry or governmental systems beyond insurance.

Figure 1:
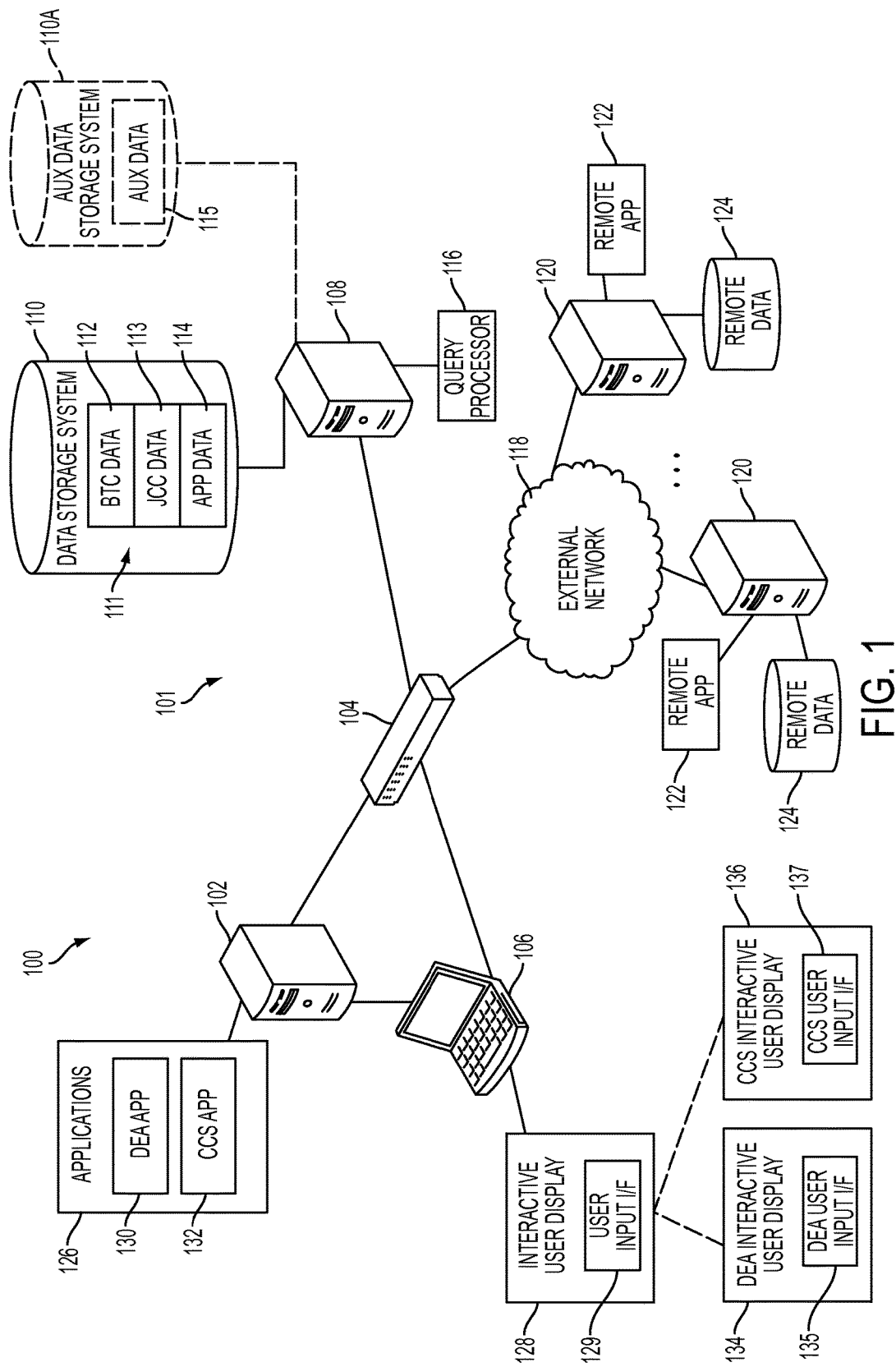
FIG. 1 depicts a block diagram of a system according to some embodiments of the present invention.

Turning now to FIG. 1, a system 100 is depicted upon which an interactive classification code selection process may be implemented. The system 100 includes a data entry and analysis system 101, which may include an application server 102 coupled to a mediation layer gateway 104. A user system 106 can be coupled to the application server 102 and the mediation layer gateway 104. The mediation layer gateway 104 is also coupled to a query server 108 that accesses and indexes data in a data storage system 110. The data storage system 110 can hold a database 111 that may include a variety of data, such as business-type classification data 112, job classification code data 113, and application data 114, as well as other data (not depicted). In an exemplary embodiment, the business-type classification data 112 and the job classification code data 113 can include data organized in one or more tables of records that may be selected as part of the interactive selection process. The application data 114 may include other data values to support an application program that uses the interactive classification code selection process. For example, in an insurance quotation application, the business-type classification data 112 may include business-type classification codes and multiple levels of description, and the job classification code data 113 may include mandated job classification codes and associated data from a regulating authority. The application data 114 can include applicant information, pricing models, underwriting guidelines, and the like. A query processor 116 may execute on the query server 108 to retrieve selected records from the database 111 based on a query from the application server 102, the user system 106, or other system.

The database 111 may include or link to records stored in other data storage systems, such as an auxiliary data storage system 110A. The auxiliary data storage system 110A can hold auxiliary data 115 that supports or supplements data retrieval from the business-type classification data 112 and/or the job classification code data 113. For instance, certain business classification data and/or job classification data can be stored in the auxiliary data 115 of the auxiliary data storage system 110A. The auxiliary data storage system 110A may represent a legacy data source that is accessible by the query server 108 as part of classification code searching and presentation of extended and related data sets. Alternatively, the auxiliary data storage system 110A can be omitted and the auxiliary data 115 can be merged with the database 111 in the data storage system 110.

The data entry and analysis system 101 may access an external network 118 via the mediation layer gateway 104 and/or one or more other firewalls or gateways (not depicted). One or more remote servers 120 can be accessed through the external network 118. Each remote server 120 can include one or more remote applications 122 and remote data 124. The external network 118 can be a large-scale, global network, such as the Internet. The remote data 124 may be accessed by the user system 106, for instance, via a hyperlink. The remote data 124 can also be used to update data in the database 111 and/or auxiliary data 115. In one embodiment, the business-type classification data 112 and/or the job classification code data 113 are updated by the data entry and analysis system 101 making requests to access the remote data 124 and reformatting the remote data 124 as needed to store in the business-type classification data 112 and/or the job classification code data 113. In an alternate embodiment, one of the remote applications 122 with proper authentication can push updates from the remote data 124 to the business-type classification data 112 and/or the job classification code data 113 and mark the data as updated.

The application server 102 can source a number of application programs 126 that may be executed by the application server 102, the user system 106, or in a distributed manner between the application server 102, the user system 106 and/or other systems. The user system 106 includes an interactive user display 128 to display information and a user input interface 129 that collects inputs from a user. The interactive user display 128 can be generated by one or more of the applications 126 on the application server 102 and provides information and input options for the user input interface 129. For example, the interactive user display 128 can appear as a data entry template where the user input interface 129 includes user modifiable fields to enter data values or make selections.

The mediation layer gateway 104 can provide an enterprise service bus (ESB) that routes various communications and supports a number of protocols within the system 100. For example, the mediation layer gateway 104 may process Simple Object Access Protocol (SOAP) requests and responses relative to the application server 102, Representational State Transfer (REST) requests and responses using Asynchronous JavaScript™ and extensible markup language (XML) (AJAX) relative to the user system 106, Hypertext Transfer Protocol (HTTP) query requests and responses relative to the query server 108, and any number of known protocols relative to the external network 118. A number of other protocols can be used throughout the system 100. For instance, the application server 102 and user system 106 may support JavaServer™ Faces (JSF)/Facelet requests and responses, and the query server 108 may access the data storage system 110 and/or the auxiliary data storage system 110A using Structured Query Language (SQL) and/ or Open Database Connectivity (ODBC).

In the example of FIG. 1, each of the application server 102, the mediation layer gateway 104, the user system 106, the query server 108, the data storage system 110, and the remote servers 120 can include a processor (e.g., a processing device such as one or more microprocessors, one or more microcontrollers, one or more digital signal processors) that receives instructions (e.g., from memory or like device), executes those instructions, and performs one or more processes defined by those instructions. Instructions may be embodied, for example, in one or more computer programs and/or one or more scripts. In one example, the data entry and analysis system 101 executes computer instructions for implementing the exemplary processes described herein. Instructions that implement various process steps can be executed by different elements of the data entry and analysis system 101. For example, user input on the user system 106 can result in a request for data as a query that is processed by the query server 108. User inputs can also result in requests to the application server 102 which may also result in another request for data as a query processed by the query server 108. Although depicted separately, one or more of the application server 102, the mediation layer gateway 104, the user system 106, the query server 108, and the data storage system 110 can be combined or further subdivided. In an embodiment, the data entry and analysis system 101 is implemented by an insurance company.

In some embodiments, the application server 102 may include one or more electronic and/or computerized controller devices such as computer servers communicatively coupled to interface with the user system 106 (e.g., one or more client computers) and/or third-party devices (directly and/or indirectly). According to some embodiments, the application server 102 may be located remote from the user system 106. The application server 102 may also or alternatively include a plurality of electronic processing devices located at one or more various sites and/or locations. In an exemplary embodiment, the application server 102 is a JBoss™ application server.

According to some embodiments, the application server 102 and/or the user system 106 may store and/or execute specially programmed instructions to operate in accordance with one or more embodiments described in this disclosure. The application server 102 and/or the user system 106 may, for example, execute one or more programs that perform business-type classification data selection and job classification code data selection.

The user system 106 may be implemented using a computer executing one or more computer programs for carrying out processes described herein. In one embodiment, the user system 106 may be a personal computer (e.g., a laptop, desktop, etc.), a network server-attached terminal (e.g., a thin client operating within an internal network of the application server 102), or a portable device (e.g., a tablet computer, personal digital assistant, smart phone, etc.). In an embodiment, the user system 106 is operated by an insurance professional, such as a product manager, broker, or agent of an insurance company. It will be understood that while only a single user system 106 is shown in FIG. 1, there may be multiple user systems 106 communicatively coupled to the application server 102 and mediation layer gateway 104. The user systems 106 can connect to elements of the data entry and analysis system 101 via an enterprise network and/or through the external network 118.

Various networks may be used to establish communication within the system 100, such as a wide area network (WAN), a local area network (LAN), a global network (e.g., Internet), a virtual private network (VPN), and an intranet. Communication within the system 100 may be implemented using a wireless network or any kind of physical network implementation known in the art.

Information stored in the data storage system 110 and/or the auxiliary data storage system 110A may be retrieved and manipulated via the query server 108, based on requests from the application server 102 or the user system 106, for example. The data storage system 110 and/or the auxiliary data storage system 110A may be implemented using a variety of devices for storing electronic information. It is understood that the data storage system 110 and/or the auxiliary data storage system 110A may be implemented using memory contained in the query server 108 or it may be a separate physical system, as shown in FIG. 1. It will be understood that multiple storage devices may be employed in the data storage system 110 and/or the auxiliary data storage system 110A. For example, the storage devices of the data storage system 110 and/or the auxiliary data storage system 110A may be dispersed across the system 100, and each of the storage devices may be logically addressable as a consolidated data source across a distributed environment. In an embodiment, the data storage system 110 and/or the auxiliary data storage system 110A may include one or more third-party data devices. According to some embodiments, data may be stored by or provided via one or more optional third-party data devices of system 100. A third-party data device may comprise, for example, an external hard drive or flash drive connected to the system 100, a remote third-party computer system for storing and serving data (e.g., claim data, business data, state insurance data) for use in performing one or more functions described in this disclosure, or a combination of such remote and/or local data devices. In one embodiment, one or more companies and/or end users may subscribe to or otherwise purchase data (e.g., demographic, financial, employment, claim, or other data) from a third party and receive the data via the third-party data device.

Each of the application server 102, the mediation layer gateway 104, the user system 106, the query server 108, the data storage system 110, the auxiliary data storage system 110A, and the remote servers 120 can include a local data storage device, such as a memory device. A memory device, also referred to herein as "computer-readable memory" (e.g., non-transitory memory devices as opposed to transmission devices or media), may generally store program instructions, code, and/or modules that, when executed by a processing device, cause a particular machine to function in accordance with one or more embodiments described herein.

The applications 126 of application server 102 can include multiple application programs or sequences of instructions to implement processes as described herein. For example, a data entry and analysis (DEA) application 130 may include a sequence of executable instructions that enable a user to enter relevant information, access associated application data 114, perform analysis tasks such as determining eligibility, initiate a classification process, and provide results and reports. Although depicted as a single block in FIG. 1, the DEA application 130 can include a collection of modules, routines, functions, scripts, and the like to implement a data entry and analysis process. A classification code selection (CCS) application 132 may also be provided to ensure that a correct business-type classification code and a most likely job classification code are identified upon which other data values depend. The CCS application 132 can also provide a list of job classification codes based on a selected business type and associated geographic location as a reduced number of likely options from which a user can select an entry. Data associated with a selected entry may be used to prefill a number of fields to enhance data population speed, reduce the risk of errors, and decrease a number of related searches initiated in the system 100. The CCS application 132 can interface with the query processor 116 to perform lookup and reporting of the business-type classification data 112 and the job classification code data 113 in combination with the DEA application 130. The query processor 116 may provide rapid feedback to the CCS application 132 by maintaining a number of indexes into the business-type classification data 112 and the job classification code data 113, which may include synonym definitions to support matching on similar terms when a search is initiated. The query processor 116 or another process on the query server 108 may include an automated process that periodically updates and indexes the database 111. The query processor 116 can also support wildcard searches based on partial string matching to exact terms or similar terms based on synonym definitions. Although depicted separately, the DEA application 130 and the CCS application 132 can be combined to form a single application in the applications 126. The CCS application 132 may alternatively be decomposed into a number of sub-applications, modules, or functional units.

According to a design pattern of the interactive user display 128 and user input interface 129, the user system 106 can include one or more instances of a DEA interactive user display 134 with a DEA user input interface 135 that interacts with the DEA application 130. The DEA interactive user display 134 may define one or more form templates to be populated with data obtained through the application server 102 and/or the query server 108 as a Web browser-based or stand-alone application implementation. The DEA interactive user display 134 and DEA user input interface 135 may include a sequence of display screens and user interfaces to be presented at different points during progression of the process. For example, different interactive interface views can be produced to enter specific data items, respond to questions, and output results.

Also according to a design pattern of the interactive user display 128 and user input interface 129, a CCS interactive user display 136 and CCS user input interface 137 can be defined separately or be included as part of the DEA interactive user display 134 and DEA user input interface 135. The CCS interactive user display 136 and CCS user input interface 137 interact with the CCS application 132 according to one or more form templates populated with user data and data obtained through the application server 102 and/or the query server 108 as a Web browser-based or stand-alone application implementation. Depending upon a search type performed, the CCS interactive user display 136 may present different classification code selection options that can be selected using the CCS user input interface 137.

One example of a general sequence of interactions that can be initiated by a user in the system 100 begins with user input received on the user input interface 129 (which may be the DEA user input interface 135 or CCS user input interface 137), for instance, from a keyboard and/or mouse/pointer device. When a request, such as a search request, is received at the user system 106, the search request may be forwarded to the mediation layer gateway 104 using an AJAX interface as a REST-based request. In response, the mediation layer gateway 104 can generate a query request for the query server 108 as an HTTP query request. The query processor 116 performs a query process to find potential matches to the query request in the data storage system 110 and/or the auxiliary data storage system 110A and a response may be provided as an HTTP query response from the query server 108 to the mediation layer gateway 104. Subsequently, the mediation layer gateway 104 can make the query response available to be obtained by an AJAX interface as a REST-based response for the user system 106. With regard to the application server 102, a request from a client can be obtained, such as a facelet request obtained by the application server 102 from the user system 106. The request can be sent from the application server 102 to the mediation layer gateway 104 as a SOAP-based request using a JAX-web service. Again, the mediation layer gateway 104 can use an HTTP query request and an HTTP query response in communicating with the query server 108. A response can be obtained from the mediation layer gateway 104 by the application server 102 as a SOAP-based response using a JAX-web service. The application server 102 can provide the facelet response to the user system 106.

Figure 2:
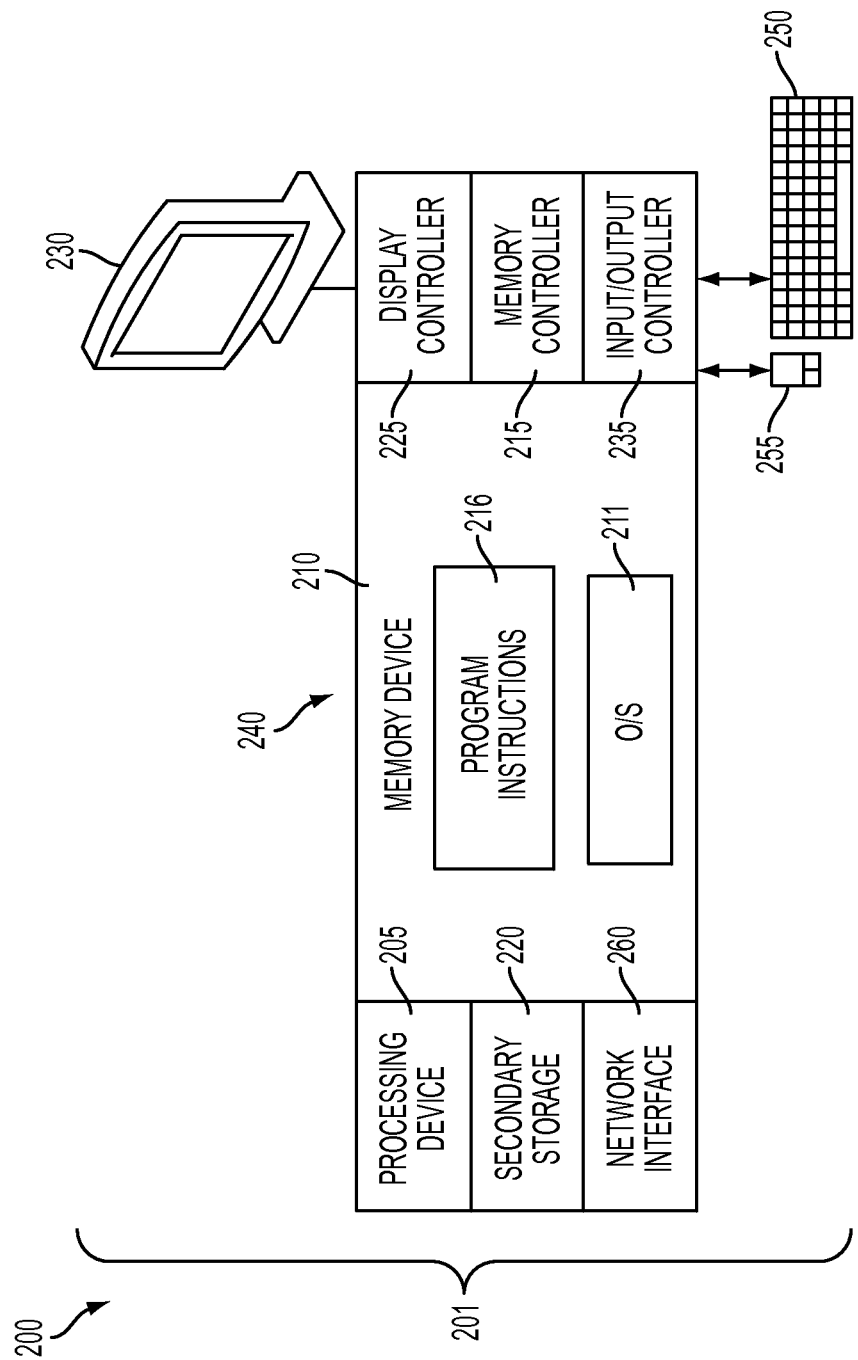
FIG. 2 depicts a block diagram of a system according to some embodiments of the present invention.

FIG. 2 depicts a block diagram of a system 200 according to an embodiment. The system 200 is depicted embodied in a computer 201 in FIG. 2. The system 200 is an example of the user system 106 of FIG. 1. The application server 102, the mediation layer gateway 104, the query server 108, and the remote servers 120 of FIG. 1 can also include similar computer elements as depicted in the computer 201 of FIG. 2.

In an exemplary embodiment, in terms of hardware architecture, as shown in FIG. 2, the computer 201 includes a processing device 205 and a memory device 210 coupled to a memory controller 215 and an input/output controller 235. The input/output controller 235 can be, for example, but not limited to, one or more buses or other wired or wireless connections, as is known in the art. The input/output controller 235 may have additional elements, which are omitted for simplicity, such as controllers, buffers (caches), drivers, repeaters, and receivers, to enable communications. Further, the computer 201 may include address, control, and/or data connections to enable appropriate communications among the aforementioned components.

In an exemplary embodiment, a keyboard 250 and mouse 255 or similar devices can be coupled to the input/output controller 235. Alternatively, input may be received via a touch-sensitive or motion sensitive interface (not depicted). The computer 201 can further include a display controller 225 coupled to a display 230.

The processing device 205 is a hardware device for executing software, particularly software stored in secondary storage 220 or memory device 210. The processing device 205 can be any custom made or commercially available computer processor, a central processing unit (CPU), an auxiliary processor among several processors associated with the computer 201, a semiconductor-based microprocessor (in the form of a microchip or chip set), a macro-processor, or generally any device for executing instructions.

The memory device 210 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), flash memory, programmable read only memory (PROM), tape, compact disc read only memory (CD-ROM), flash drive, disk, hard disk drive, diskette, cartridge, cassette or the like, etc.). Moreover, the memory device 210 may incorporate electronic, magnetic, optical, and/or other types of storage media. Accordingly, the memory device 210 is an example of a tangible computer readable storage medium 240 upon which instructions executable by the processing device 205 may be embodied as a computer program product. The memory device 210 can have a distributed architecture, where various components are situated remote from one another, but can be accessed by the processing device 205.

The instructions in memory device 210 may include one or more separate programs, each of which comprises an ordered listing of executable instructions for implementing logical functions. In the example of FIG. 2, the instructions in the memory device 210 include a suitable operating system (OS) 211 and program instructions 216. The operating system 211 essentially controls the execution of other computer programs and provides scheduling, input-output control, file and data management, memory management, and communication control and related services. When the computer 201 is in operation, the processing device 205 is configured to execute instructions stored within the memory device 210, to communicate data to and from the memory device 210, and to generally control operations of the computer 201 pursuant to the instructions. Examples of program instructions 216 can include instructions to implement the DEA interactive user display 134, the DEA user input interface 135, the CCS interactive user display 136, and/or the CCS user input interface 137 of FIG. 1, where the system 200 is an embodiment of the user system 106 of FIG. 1. Further examples of the program instructions 216 can include instructions to implement the DEA application 130 and CCS application 132 of FIG. 1, the query processor 116 of FIG. 1, and the remote applications 122 of FIG. 1.

The computer 201 of FIG. 2 also includes a network interface 260 that can establish communication channels with one or more other computer systems via one or more network links. The network interface 260 can support wired and/or wireless communication protocols known in the art. For example, when embodied in the user system 106 of FIG. 1, the network interface 260 can establish communication channels with the application server 102 and the mediation layer gateway 104 of FIG. 1.

Figure 3A:
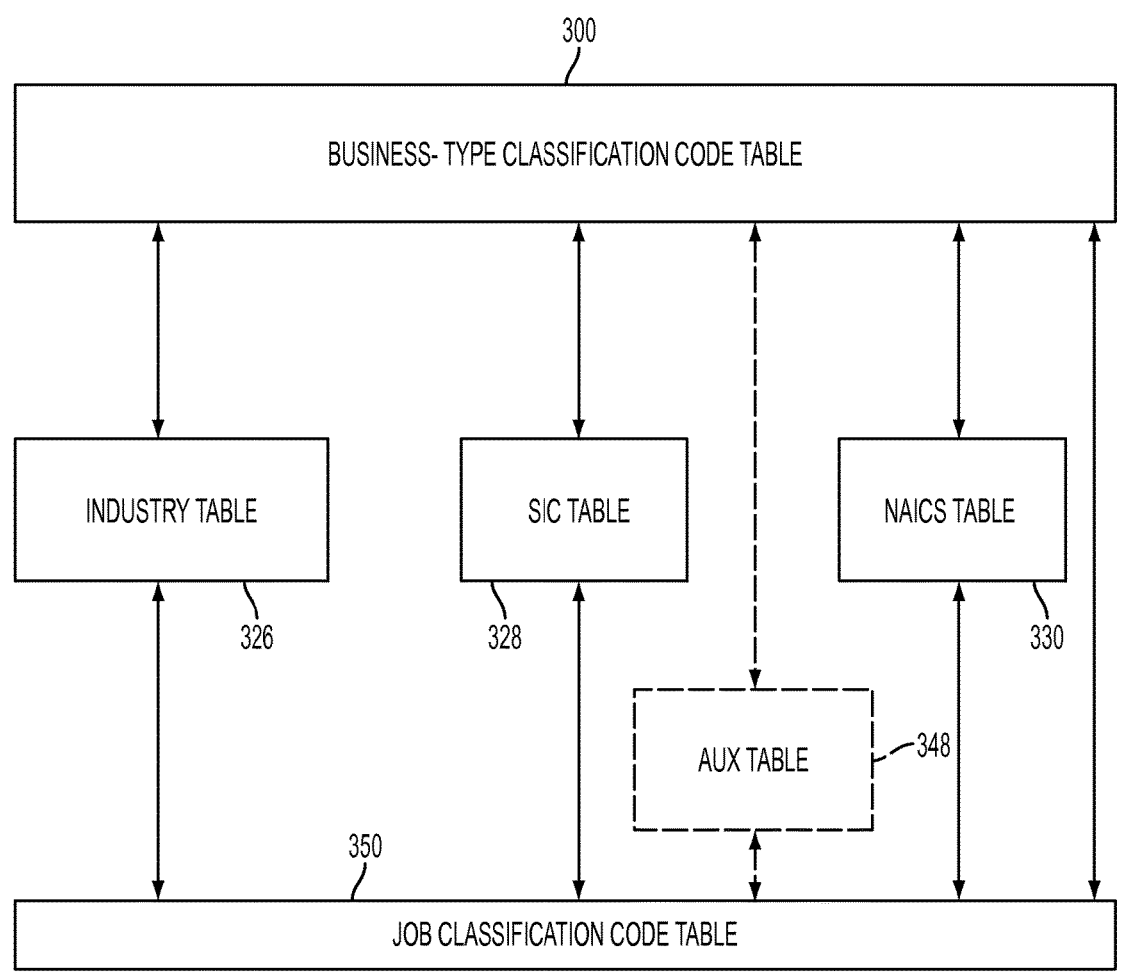
FIG. 3A depicts relationships between tables of a database according to some embodiments of the present invention.

FIG. 3A depicts an example of relationships between various tables of a database, such as database 111 of FIG. 1, that can be included in the business-type classification data 112, job classification code data 113, application data 114, and/or auxiliary data 115 of FIG. 1. A business-type classification code table 300 can be linked to an industry table 326, a Standard Industry Classification (SIC) table 328, a North American Industry Classification System (NAICS) table 330, an auxiliary table 348, and a job classification code table 350. The job classification code table 350 may also be linked to the industry table 326, SIC table 328, NAICS table 330, and auxiliary table 348. Additionally, one or more other tables (not depicted) may be linked to the business-type classification code table 300 and/or the job classification code table 350. The business-type classification code table 300 can include data for business-type classification to support generating insurance quotes that are business-type sensitive. The industry table 326, SIC table 328, and NAICS table 330 may include various codes and descriptions provided by a regulating or government entity to define industry segments and various types of organizations. The job classification code table 350 can include geographic location-based rules for quoting and issuing insurance policies, such as location-specific workers compensation insurance job code classification data. The auxiliary table 348 can define other product information, other classification data, or further supplemental data related to business-type classification and/or job code classification. As one example, the auxiliary table 348 can include various rules and data associated with quoting an insurance policy.

Figure 3B:
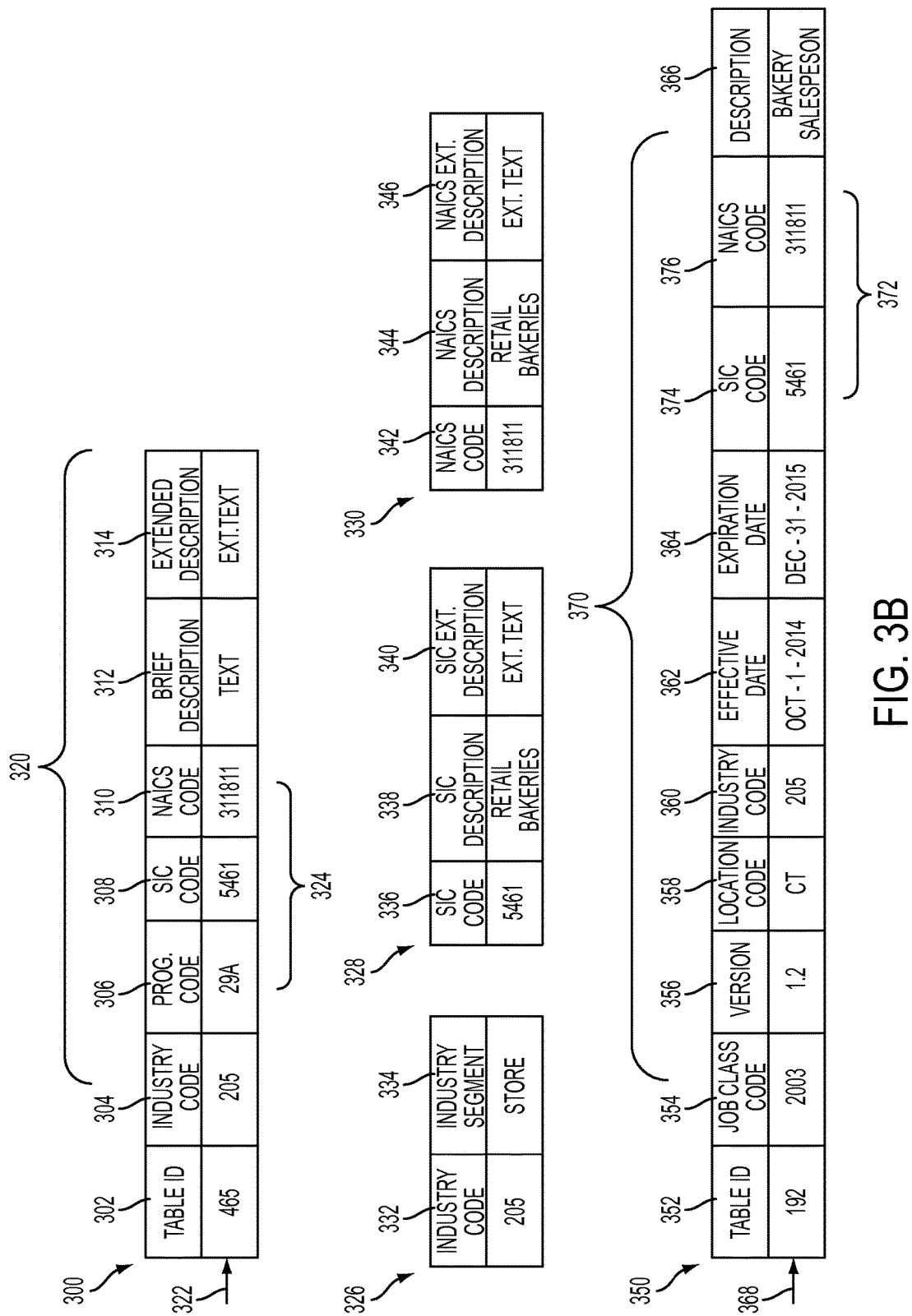
FIG. 3B depicts further details of the tables of FIG. 3A according to some embodiments of the present invention.

Turning now to FIG. 3B, an example of the business-type classification code table 300 of FIG. 3A is depicted as may be included in the business-type classification data 112 of FIG. 1. The business-type classification code table 300 represents a collection of data values that can be searched, for instance, based on a query request from the CCS application 132 via the CCS user input interface 137 of FIG. 1. The business-type classification code table 300 may be manually populated based on published data sources or extracted from the remote data 124 of FIG. 1. The business-type classification code table 300 can also be populated using legacy data for previously defined company specific codes and descriptions.

In the example of FIG. 3B, the business-type classification code table 300 includes a table identifier 302, an industry code 304, a program code 306, a SIC code 308, a NAICS code 310, a brief classification description 312, and an extended classification description 314. It will be understood that additional or fewer fields beyond those depicted in FIG. 3B can be included in the business-type classification code table 300. The combination of the industry code 304, program code 306, SIC code 308, NAICS code 310, brief classification description 312, extended classification description 314 may be collectively referred to as business-type classification data 320 for preparing quotes and issuing insurance policies. The table identifier 302 may serve as an index to a particular entry or row 322 in the business-type classification code table 300. The industry code 304 can be an industry group code that aligns with definitions generated by a regulating body. The program code 306 may be a company-specific code used to classify business types. The SIC code 308 and the NAICS code 310 can be defined according to standards promulgated by governmental bodies. The program code 306, SIC code 308, and/or NAICS code 310 may be generally referred to as a business classification code 324. The brief classification description 312 includes a shorter text description that is associated with the business classification code 324, while the extended classification description 314 includes a longer text description that is associated with the business classification code 324. For instance, the brief classification description 312 may include one or two words, while the extended classification description 314 may include one or two sentences.

The extended classification description 314 includes further information on the types of activities that fit the associated business classification code 324. As an example, an entry or row 322 in the business-type classification code table 300 having a brief classification description 312 of "Bakery" can include an extended classification description 314 such as: "An operation primarily engaged in the retail sale of an assortment of baked goods. Many retail bakeries are also cafés, serving coffee and tea to customers." The brief classification description 312 enables users to quickly scan a list to find one or more potential matches, while the extended classification description 314 provides a detailed explanation to increase confidence in accurately selecting a proper business type classification for a given business, thereby reducing a number of additional queries initiated in the data entry and analysis system 101 of FIG. 1 and increasing the efficiency of the system 100 of FIG. 1.

A number of tables related to the business-type classification code table 300 may be defined to provide additional related information. In the example of FIG. 3B, the industry table 326, SIC table 328, and NAICS table 330 include additional information that may also be searchable as part of a business-type classification search. For instance, the industry table 326 can include additional industry information, such as a list of industry codes 332 and industry segment descriptions 334. The SIC table 328 can include a list of SIC codes 336, SIC descriptions 338, and SIC extended descriptions 340. The NAICS table 330 can include a list of NAICS codes 342, NAICS descriptions 344, and NAICS extended descriptions 346.

The industry code 304 of the business-type classification code table 300 may have a corresponding entry in the industry table 326 that matches one of the industry codes 332 and the industry segment descriptions 334. Therefore, if an industry segment search is initiated as a numerical value, the industry code 304 can be directly searched; however, if the industry segment search includes text, the search can be directed to the industry table 326 to search for an entry in the industry segment descriptions 334 that matches the search term or terms, and an associated value in the industry codes 332 can be used to search against the business-type classification code table 300 for a match in the industry code 304. As a further option, the industry segment descriptions 334 can be directly incorporated in the business-type classification code table 300 as a searchable field. Alternatively, the industry code 304 can be used as an initial filter on industry type and further searching can be performed after constraining the industry codes 332 and/or industry segment descriptions 334.

The brief classification description 312 in the business-type classification code table 300 may exactly match one of the SIC descriptions 338, one of the NAICS descriptions 344, or be phrased to capture intersecting terminology between the SIC descriptions 338 and the NAICS descriptions 344. Similarly, the extended classification description 314 in the business-type classification code table 300 may exactly match one of the SIC extended descriptions 340, one of the NAICS extended descriptions 346, or be phrased to capture intersecting descriptions between the SIC extended descriptions 340 and the NAICS extended descriptions 346. Accordingly, a SIC search that includes a numeric value may initiate a search against the SIC code 308 in the business-type classification code table 300, while a SIC search that includes text can be performed against the SIC descriptions 338 and/or the SIC extended descriptions 340 with the corresponding SIC code 336 used to locate a matching value in the SIC code 308. Similarly, a NAICS search that includes a numeric value may initiate a search against the NAICS code 310 in the business-type classification code table 300, while a NAICS search that includes text can be performed against the NAICS descriptions 344 and/or the NAICS extended descriptions 346 with the corresponding NAICS code 342 used to locate a matching value in the NAICS code 310. Alternatively, the SIC descriptions 338, SIC extended descriptions 340, NAICS descriptions 344, and/or NAICS extended descriptions 346 can be directly incorporated in the business-type classification code table 300 as one or more searchable fields.

In the example of FIG. 3B, the job classification code table 350 includes a table identifier 352, a job class code 354, a version number 356, a location code 358, an industry code 360, an effective date 362, an expiration date 364, and a description 366. The table identifier 352 may serve as an index to a particular entry or row 368 in the job classification code table 350. The job class code 354 can be a numerical classification code as defined by one or more regulating body, such as the National Council on Compensation Insurance (NCCI) or state rating bureaus. Values of the job class code 354 are defined as separate codes that differentiate between various job duties or "scope of work performed" by workers. The version number 356 may indicate a job classification code definition version that defines a mapping between the job class code 354 and associated wording in the description 366 for the geographic location identified in the location code 358.

The location code 358 can be a text field, such as a two-digit state code or a numeric code used to map to a location code formatted with any number of characters. For example, the location code 358 could be formatted to include a value of "CT" for the state of Connecticut or a number that serves as an index to a separate table (not depicted), e.g., numeric code "06" mapping to "Connecticut". The job class codes 354 are effective on specific dates and expire on a specific date as defined by the effective date 362 and expiration date 364 respectively. The description 366 may be defined by the NCCI or state rating bureau that generated the job class code 354. Specific wording of each description 366 can vary for similar job class codes 354 depending upon the location code 358, as various state rating bureaus associated with different locations can generate different wording for the description 366. The job classification code table 350 may also include other code data 372 associated with the location code 358 and the job class code 354. In the example of FIG. 3B, the other code data 372 includes a SIC code 374 and a NAICS code 376. The combination of the job class code 354, version number 356, location code 358, industry code 360, effective date 362, expiration date 364, SIC code 374, NAICS code 376, and description 366 may be collectively referred to as geographic location-based rules 370 for quoting and issuing insurance policies. The particular order of data in the job classification code table 350 is merely one example and other arrangements are also contemplated in other embodiments.

In the example of FIG. 3B, the job classification code table 350 has a number of fields in common with the business-type classification code table 300. These fields can be used to extract one or more related records from the job classification code table 350 based on a search of the business-type classification code table 300. For instance, the industry code 360 can link to the industry code 304 of the business-type classification code table 300 and to the industry code 332 of the industry table 326. The SIC code 374 can link to the SIC code 308 of the business-type classification code table 300 and to the SIC code 336 of the SIC table 328. The NAICS code 376 can link to the NAICS code 310 of the business-type classification code table 300 and to the NAICS code 342 of the NAICS table 330. Linking fields between tables 300, 326, 328, 330, and 350 can enable a more robust range of search options when performing business-type classification searches. As one example, if a business-type classification search is performed against the SIC code 308, a matching value of the SIC code 308 can be used to identify one or more job class code 354 having a matching value for SIC code 374. A geographic location indicator, such as a predominant state of a business, can further filter matching results based on the location code 358 in the job classification code table 350 to increase the likelihood of identifying a correct numerical classification code in the job class code 354 along with a corresponding value of the description 366.

Figure 3C:
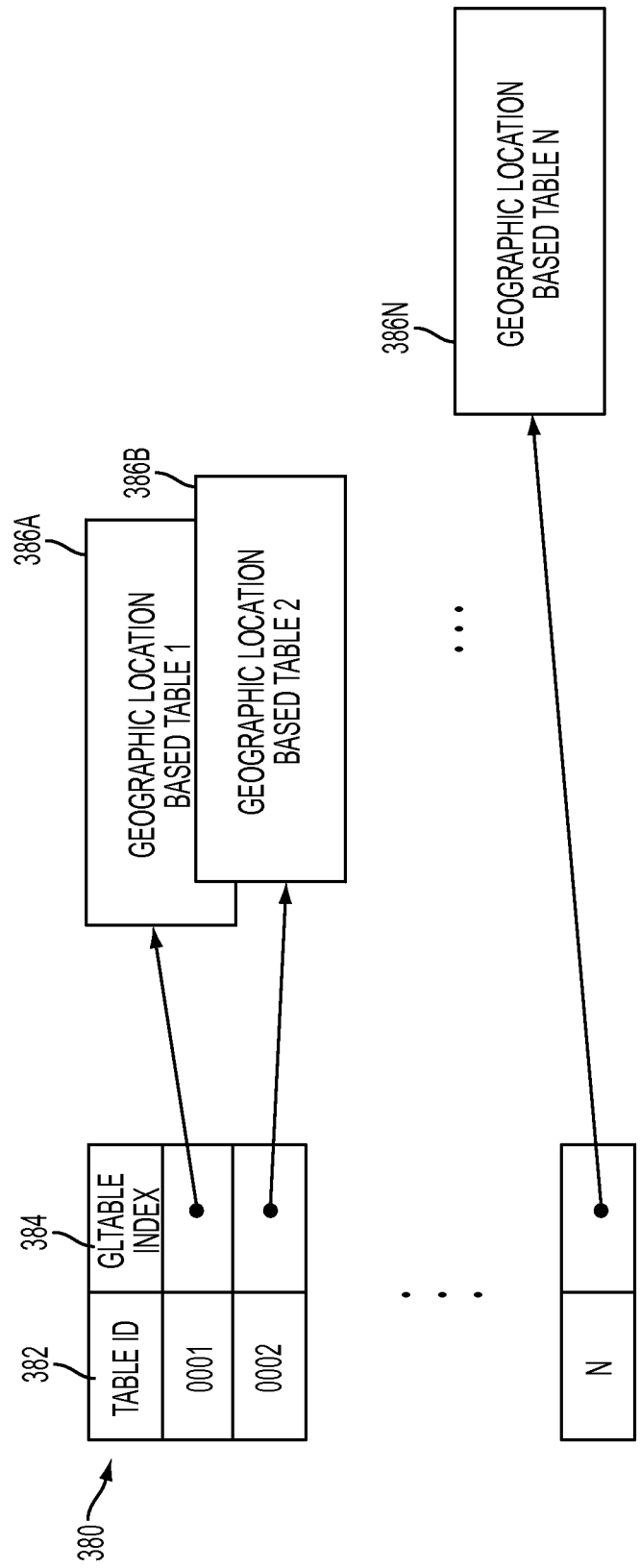
FIG. 3C depicts an example structure linking tables according to some embodiments of the present invention.

FIG. 3C depicts another example structure linking tables according to some embodiments of the present invention for organizing information based on geographic location. In the example of FIG. 3C, the contents of the job classification code table 350 of FIG. 3B are distributed between multiple tables. In this example, an index table 380 includes table identifiers 382 and geographic location table index values 384. The table identifiers 382 may be equivalent to the table identifiers 352 of FIG. 3B. The geographic location table index values 384 can point to a plurality of geographic location based tables 386A, 386B, . . . , 386N that each have a common location code, such as the location code 358 of FIG. 3B. Each of the geographic location based tables 386A-386N can include the same or substantially similar fields as described in reference to FIG. 3B that form the geographic location-based rules 370 of FIG. 3B, such as a job class code, version number, industry code, effective date, expiration date, SIC code, NAICS code, description, and/or other code data. The arrangement of information as depicted in FIG. 3C may ease update burdens and simplify data uploads from various sources (e.g., remote data 124 of FIG. 1) that provide data specific to each geographic location. For example, the geographic location based table 386A can include specific data for the state of Alabama, while the geographic location based table 386B can include specific data for the state of Alaska. Additional metadata may also be defined for each of the geographic location based tables 386A-386N, for instance, to define when each table was last updated, the source of the update, and the like.

Figure 4:
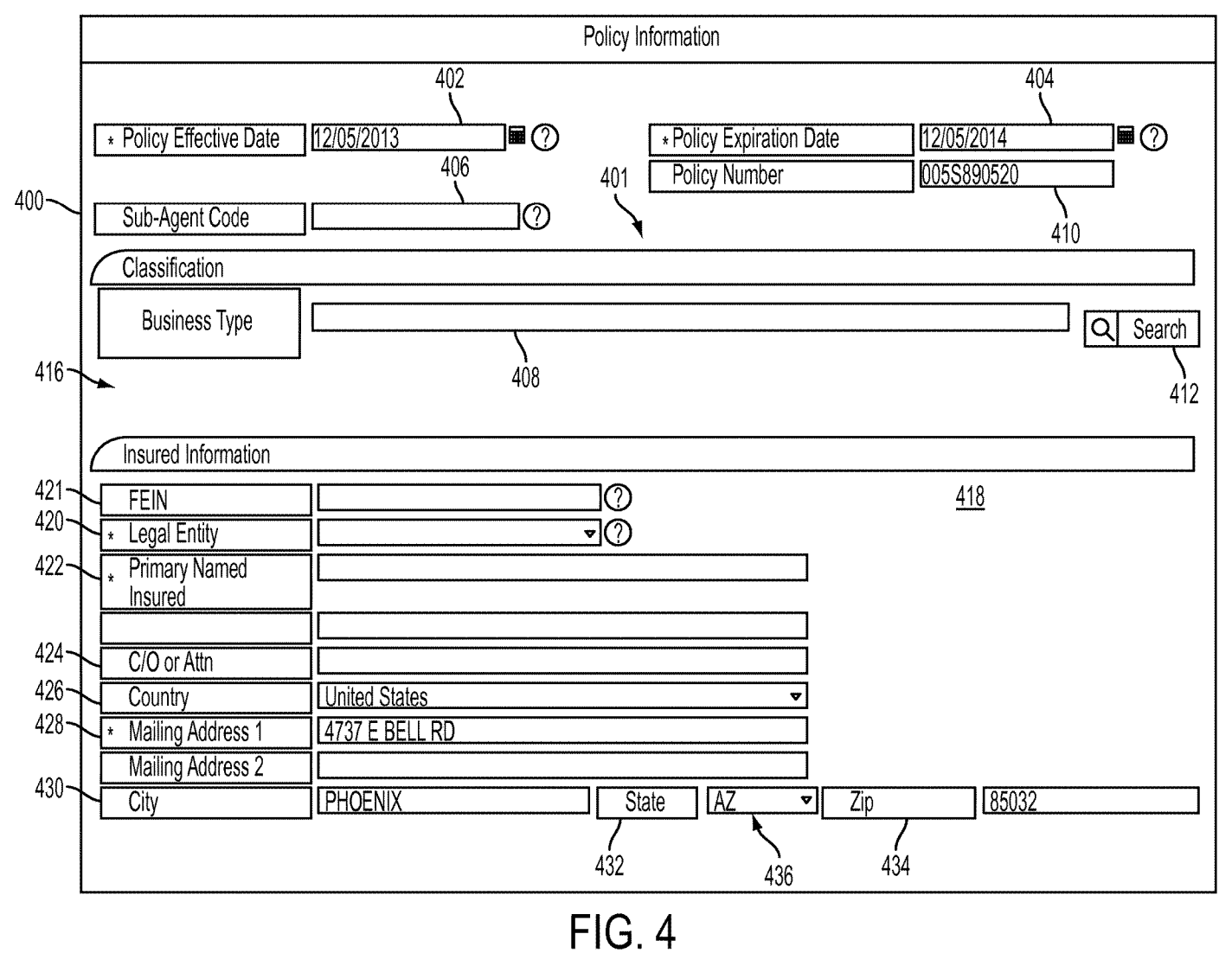

FIG. 4 depicts an example of an interactive user display 400 and user input interface 401 to populate information related to an insurance policy, for instance, as one instance of the DEA interactive user display 134 and DEA user input interface 135 of FIG. 1. The interactive user display 400 can prompt a user to enter a number of values related to an insurance policy, where the user input interface 401 defines a data entry interface for collecting information such as a policy effective date 402, a policy expiration date 404, a sub-agent code 406, a business type classification 408, and insured information 418. The insured information 418 may include a legal entity 420, a federal employer identification number (FEIN) 421, a primary named insured 422, a "care of" or "attention" identifier 424, a country 426, a mailing address 428 (e.g., street address), a city 430, a state 432, and a ZIP code 434. Numerous other data items can also be collected using a series of fields or questions. The city 430, state 432, and/or ZIP code 434 are examples of geographic locations that can impact the selection of data as constrained by the geographic location-based rules 370 of FIG. 3B. For example, the state 432 may map to the location code 358 of FIG. 3B as a geographic location indicator 436 defining a predominant state of a business. In order to prepare an insurance policy, a number of additional data values must be collected and accurately classified.

When a policy quote is initiated, a policy number 410 may be generated by the DEA application 130 of FIG. 1 to track data associated with developing the quote as values are populated. The policy effective date 402 and a policy expiration date 404 bound the term of the potential policy and may be used to select particular data sets from the data storage system 110 and/or auxiliary data storage system 110A of FIG. 1 that are date sensitive, e.g., effective date 362 and expiration date 364 of FIG. 3B. The sub-agent code 406 may be used to identify an agent responsible for quoting an associated insurance policy.

A classification portion 416 of the interactive user display 400 and user input interface 401 may be managed by the CCS application 132 of FIG. 1 as a business-type classification interface from which a business-type classification selection is initially made as the business type classification 408 upon selecting a search button 412. The classification portion 416 defines a most likely classification code. The business type classification 408 needs to align with a value of the business-type classification data 320 of FIG. 3B such that all associated codes, including one or more associated business classification codes 324, are properly selected. A user may enter a search string in the user input interface 401 for the business type classification 408 and select the search button 412 or otherwise trigger a search. The business type classification 408 is part of a business-type classification interface and selecting the search button 412 may trigger the CCS application 132 of FIG. 1 to initiate a search. If no match is found or multiple results are found or if the business type classification 408 is not populated prior to initiating a search, a further interactive user display, such as an interactive user display 500 of FIG. 5, may be displayed.

Figure 5:
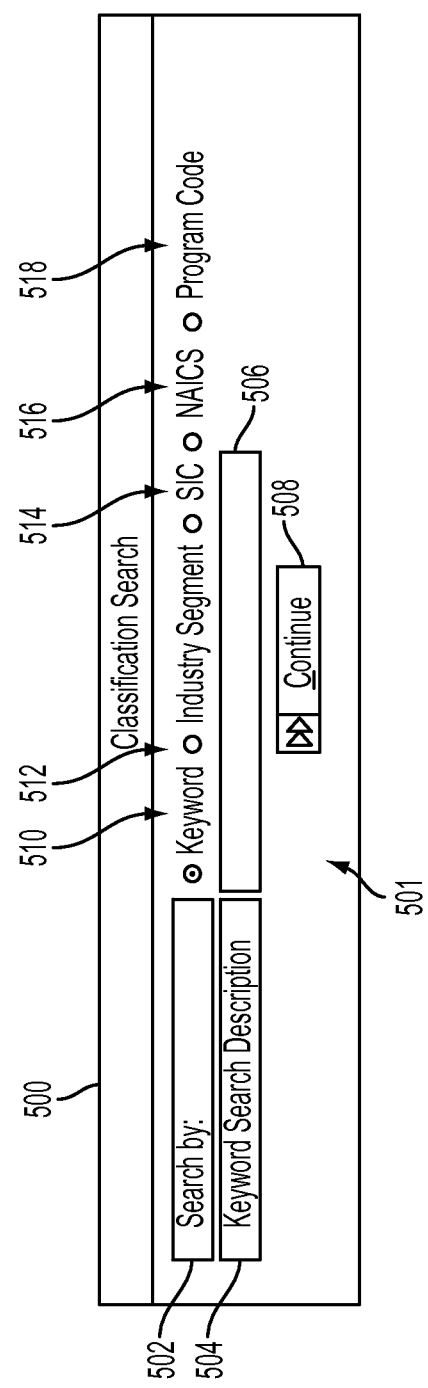
FIG. 5 depicts another example of an interactive user display and user input interface according to some embodiments of the present invention.

FIG. 5 depicts an embodiment of the interactive user display 500 and user input interface 501 for business-type classification searching as an example of the CCS interactive user display 136 and CCS user input interface 137 of FIG. 1, and therefore the user input interface 501 may also be referred to as a business-type classification interface. The interactive user display 500 may be displayed on a user system 106 of FIG. 1. The user input interface 501 can include a search type selection field 502, a search description field 504, a search description input 506, and a continue button 508. The search type selection field 502 may provide multiple options for a search type to be performed, such as a keyword search 510, an industry segment search 512, a SIC search 514, a NAICS search 516, and a program code search 518. Additional search options can be added to further narrow the results. A value input as the business type classification 408 of FIG. 4 may be carried through and used to populate the search description input 506. Regardless of the search type selected, the search description input 506 may support type-ahead searching using partial strings for searching and progressively refining matching values. Searching of the database 111 of FIG. 1 based on values entered into the search description input 506 can include searching for one or more of: exact string matches, partial string matches, and synonym matches. The query processor 116 of FIG. 1 can determine a match of the search description input 506 as a search string and retrieve a corresponding data set from the database 111 of FIG. 1.

If the keyword search 510 is selected, then the value in the search description input 506 may be used as a search string against the brief classification description 312 and/or extended classification description 314 of FIG. 3B. If the industry segment search 512 is selected, then the value in the search description input 506 may be used as a search string against the industry code 304 and/or the industry segment descriptions 334 of FIG. 3B. Alternatively, the industry segment search 512 can be applied as an initial filter based on the industry code 304 and/or the industry segment descriptions 334 of FIG. 3B, with further searching performed after applying an industry-based filter. If the SIC search 514 is selected, then the value in the search description input 506 may be used as a search string against the SIC code 308, the SIC descriptions 338, and/or the SIC extended descriptions 340 of FIG. 3B. If the NAICS search 516 is selected, then the value in the search description input 506 may be used as a search string against the NAICS code 310, the NAICS descriptions 344, and/or the NAICS extended descriptions 346 of FIG. 3B. If the program code search 518 is selected, then the value in the search description input 506 may be used as a search string against the program code 306 of FIG. 3B.

Figure 6:
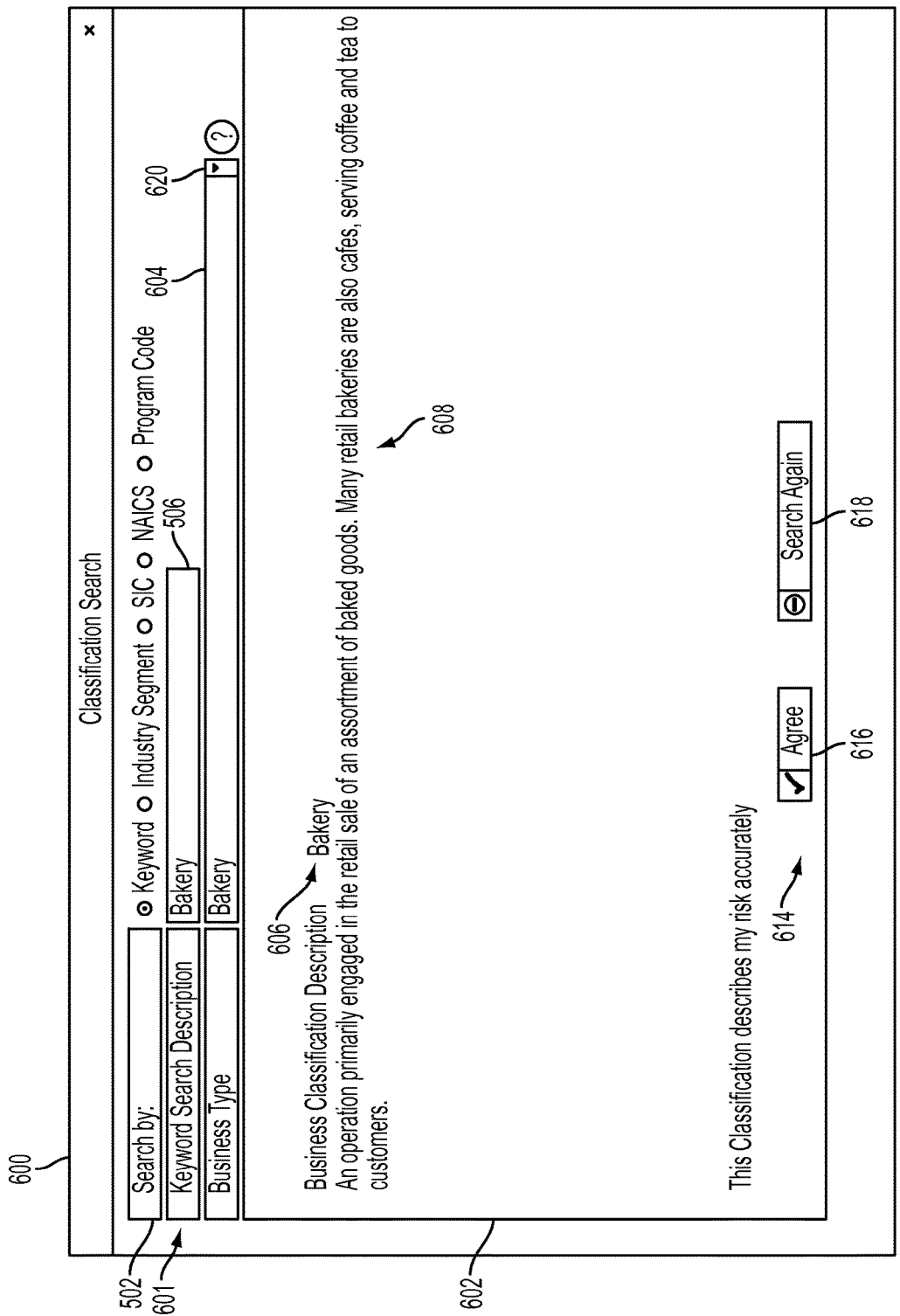
FIG. 6 depicts another example of an interactive user display and user input interface according to some embodiments of the present invention.

FIG. 6 depicts an embodiment of an interactive user display 600 and user input interface 601 for business-type classification searching as an example of the CCS interactive user display 136 and CCS user input interface 137 of FIG. 1, and therefore the user input interface 601 may also be referred to as a business-type classification interface. The interactive user display 600 of FIG. 6 is an extension of the interactive user display 500 of FIG. 5 and represents an exemplary interactive user display after searching is initiated in FIG. 5. The interactive user display 600 also includes a business classification confirmation pane 602 to output search results. In response to initiating a search of the database 111 of FIG. 1 for an entry matching the search string from search description input 506 according to the search type selected in the search type selection field 502, an entry or row 322 of FIG. 3B can be returned having corresponding business-type classification data 320 of FIG. 3B and one or more entries or rows 368 of FIG. 3B having corresponding geographic location-based rules 370 of FIG. 3B. Some values returned on the business-type classification data 320 of FIG. 3B are displayed on the interactive user display 600 and other values may not be displayed but are available for use by the DEA application 130 and/or the CCS application 132 of FIG. 1.

A business type classification 604 can be populated with a value from a matching entry of the searching, such as the brief classification description 312 of FIG. 3B. A brief classification description 606 and an extended classification description 608 can be output in the business classification confirmation pane 602 of the interactive user display 600 based on receiving the corresponding business-type classification data 320 including the brief classification description 312 and the extended classification description 314 of FIG. 3B from the database 111 of FIG. 1.

The business classification confirmation pane 602 of the interactive user display 600 can also include a confirmation request 614 that enables a user to agree that the classification is correct, e.g., using an agree button 616. Upon receiving an affirmative response to the confirmation request 614, such as a detected click event on the agree button 616, the business-type classification data 320 of FIG. 3B and the corresponding geographic location-based rules 370 of FIG. 3B returned in response to the searching are confirmed and the values can be used by the DEA application 130 of FIG. 1 to continue with the quoting process. For instance, the business classification code 324 of FIG. 3B, which may include the program code 306, the SIC code 308, and/or the NAICS code 310, can be used to populate one or more classification code fields used to prepare an insurance policy. A new search request option can be presented in combination with the confirmation request 614 to request a new search, e.g., using a search again button 618 in the business classification confirmation pane 602 of the interactive user display 600. Based on receiving an affirmative response to the new search request option, for instance by detecting a click event on the search again button 618, the contents of the business classification confirmation pane 602 including at least the brief classification description 606 and the extended classification description 608 may be cleared along with the search string in the search description input 506 and the business type classification 604.

When a search results in multiple entries in the database 111 of FIG. 1 matching the search string in the search description input 506, a list of the business-type classification data can be created that corresponds to the matching entries. A selection interface 620 may be provided to enable a user selection of one of the matching entries. The selection interface 620 can be a drop-down box that defaults to an alpha-numerically ordered first entry of the matching entries and displays additional entries of the matching entries in response to a user-initiated drop-down request, e.g., detecting a click event on a down arrow in the selection interface 620. The brief classification description 606, the extended classification description 608, and the associated business classification code 324 of FIG. 3B may be extracted from the list of the business-type classification data based on the user selection of one of the matching entries. Corresponding values from the corresponding geographic location-based rules 370 of FIG. 3B may also be extracted upon the user selection. Any changes to the business type classification 604 may be reflected in the business type classification 408 of FIG. 4.

FIG. 7 depicts an example of an interactive user display 700 and user input interface 701 as a modified version of the interactive user display 400 and user input interface 401 of FIG. 4 that may expand the classification portion 416 after an affirmative response to the confirmation request 614 of FIG. 6. After a user clicks the agree button 616 of FIG. 6, associated classification fields are populated in FIG. 7. For example, an industry segment field 702 is populated with a corresponding industry segment from the industry segment descriptions 334 having an industry code 332 that matches the industry code 304 of the business-type classification data 320 of FIG. 3B. A business classification code field 704 may be populated with an associated business classification code 324, such as a program code 306, SIC code 308, or NAICS code 310, from the business-type classification data 320 of FIG. 3B. A description field 706 may be populated with a brief classification description 312, one of the SIC descriptions 338, or one of the NAICS descriptions 344 of FIG. 3B depending upon the classification code type displayed in the business classification code field 704. The information populated in fields 702-706 can be applied for use again along with other values from the business-type classification data 320 of FIG. 3B as policy information collection and processing progresses through rating, quoting, and potentially issuing one or more insurance policies.

The user input interface 701 also includes a most likely classification code field 708 that can be used to select a most likely job classification code in populating classification records on a job type basis as part of preparing an insurance policy. If there are multiple entries from the job classification code table 350 of FIG. 3B returned that are associated with the business type classification 408 from the search of business-type classification code table 300 FIG. 3B, the most likely classification code field 708 may initially appear as a drop-down box without a selected entry. A user click action applied to a pull-down 710 of the drop-down box for the most likely classification code field 708 can result in displaying a list of entries for selection as a most likely job classification code, which is further described in reference to FIG. 8.

Figure 8:
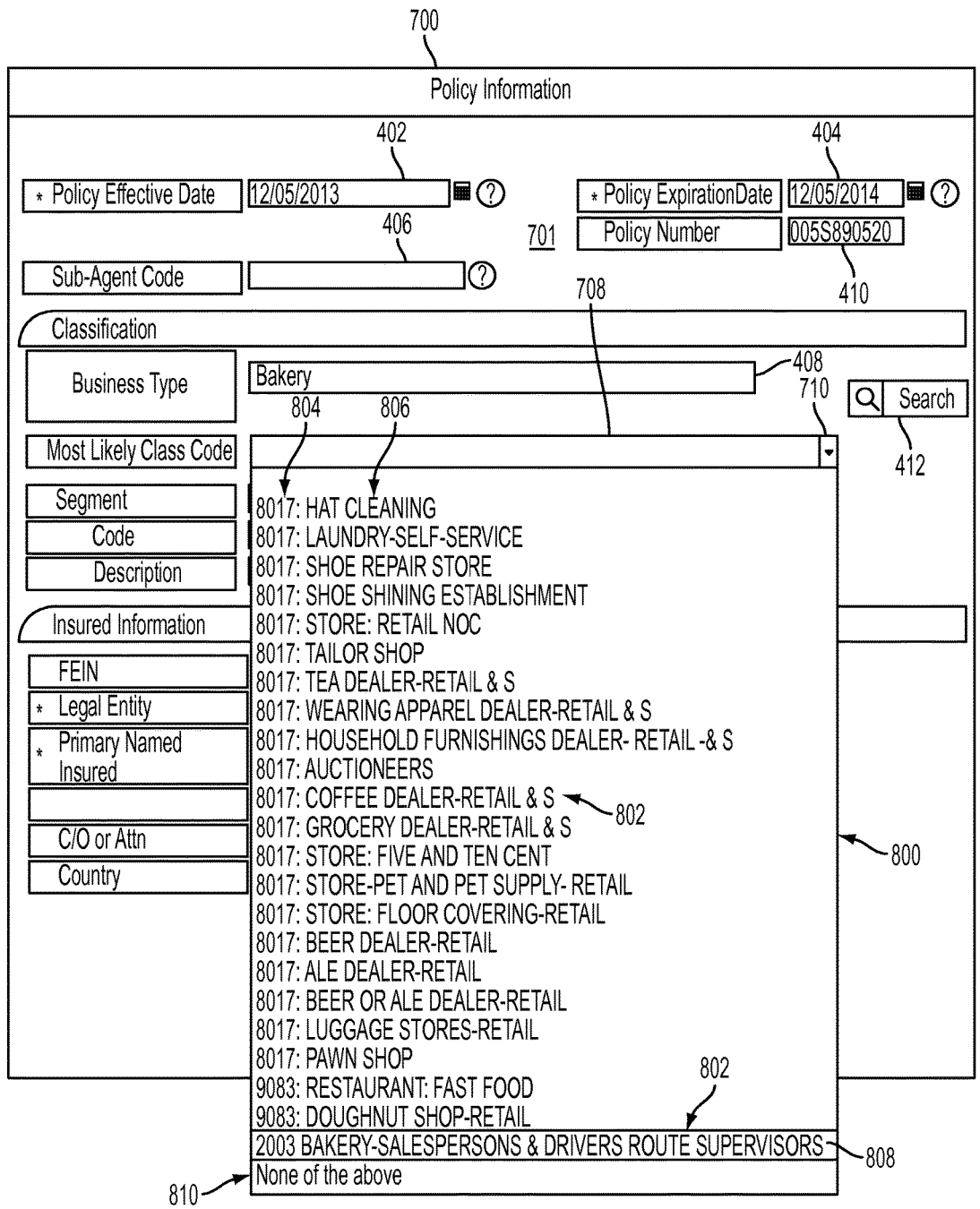
FIG. 8 depicts another example of an interactive user display and user input interface according to some embodiments of the present invention.

FIG. 8 depicts a further example of the interactive user display 700 and user input interface 701 upon selecting a pull-down 710 of the most likely classification code field 708. A data set received in response to a query of the database 111 of FIG. 1 from the plurality of geographic location-based rules 370 of FIG. 3B and the business-type classification data 320 of FIG. 3B stored in the database 111 that matches the geographic location indicator 436 of FIG. 7 and the business-type classification selection is formatted as a list 800 in FIG. 8. The policy effective date 402 may be used as an effective date in the query to further reduce the data set received in response to the query to filter the data set used to populate the list 800 based on the policy effective date 402, e.g., relative to the effective date 362 and expiration date 364 of FIG. 3B.

The list 800 can include one or more entries 802, where each of the entries 802 includes a numeric classification code 804 and a corresponding description 806. Each instance of the numeric classification code 804 can map to a value of the job class code 354 of FIG. 3B, and each instance of the corresponding description 806 can map to a value of the description 366 of FIG. 3B. In an exemplary embodiment, the geographic location indicator 436 may define a regulatory jurisdiction for workers compensation insurance coverage, and where the numeric classification code 804 and the corresponding description 806 of each of the entries 802 define classifications for workers compensation insurance according to predefined rules of the regulatory jurisdiction. A selector 808 can be used to select one of the one or more entries 802 to populate the most likely classification code field 708 with a selected instance of the numeric classification code 804. The list 800 can be modified to include a none-of-the-above option 810 to prevent population of a classification record of a classification code interface based on selecting the none-of-the-above option 810 from the list 800.

The user input interface 701 can be monitored for any changes to selected values. For example, upon detecting a change in the business-type classification selection, the most likely classification code field 708 may be cleared to prevent errant suggestions until the list 800 is updated and a new value of the most likely classification code field 708 is selected. Upon detecting a change in the geographic location indicator 436 of FIG. 7, it can be determined whether the change invalidates the most likely classification code field 708. For example, some states use the same definitions for numeric classification codes 804 and corresponding descriptions 806, while others do not. The most likely classification code field 708 can be cleared based on the invalidation.

Figure 9:
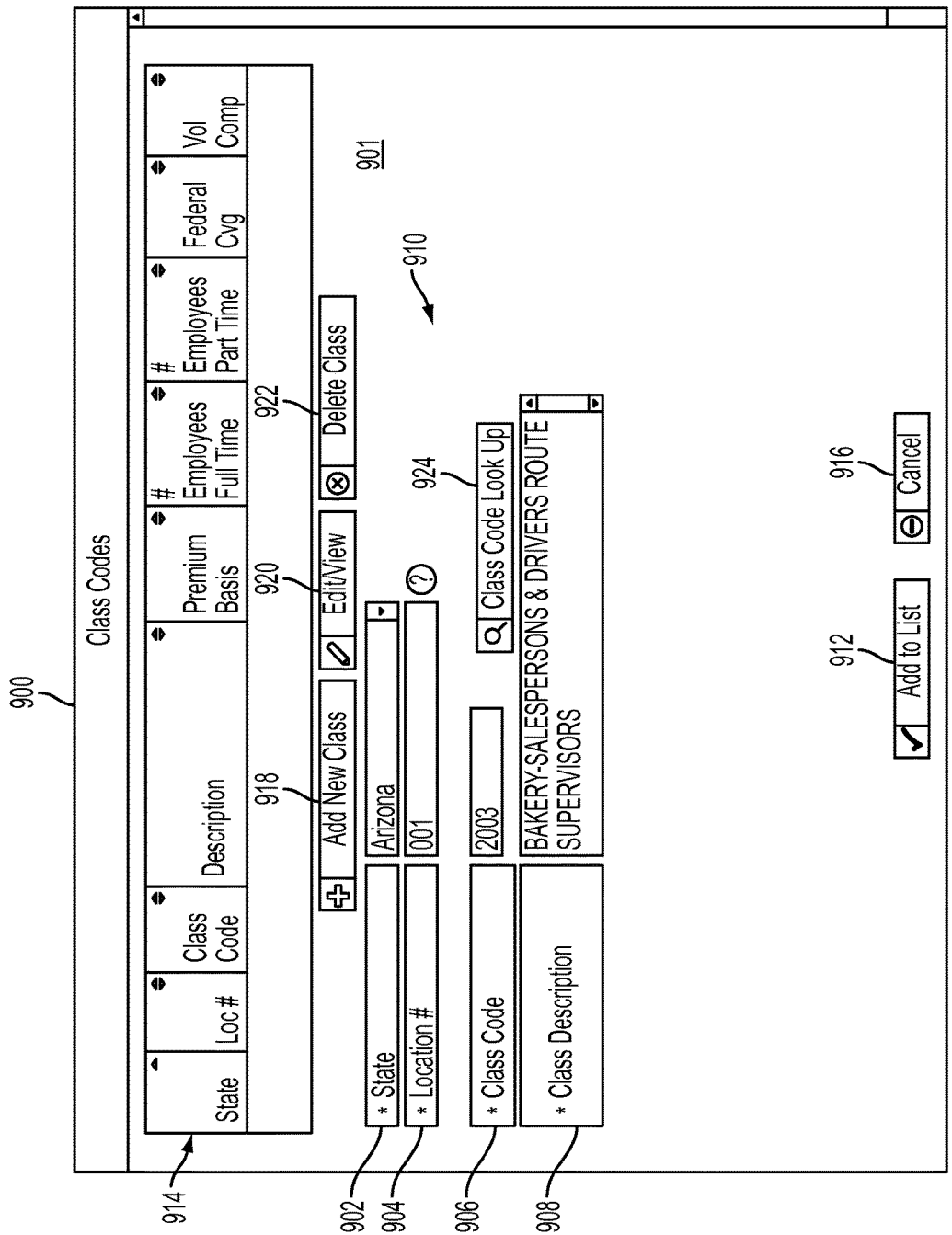
FIG. 9 depicts another example of an interactive user display and user input interface according to some embodiments of the present invention.

FIG. 9 depicts an example of an interactive user display 900 and user input interface 901 as an example of the CCS interactive user display 136 and CCS user input interface 137 of FIG. 1, where job specific classification codes and related data records are created to cover one or more job types. The user input interface 901 is an example of a classification code interface that can populate a classification record 910 initially with prefilled values based on the selections in FIG. 8. In the example of FIG. 9, the user input interface 901 includes a geographic location indicator 902, a location number 904, a numeric classification code 906, and a description 908. The geographic location indicator 902 can be constrained as a pull-down input to select a valid option from a list. The geographic location indicator 902 may be prefilled to display the predominant state value from the geographic location indicator 436 of FIGS. 4 and 7 in a longer format, while the state 432 of FIGS. 4 and 7 may appear with the same information in an abbreviated format. Both the geographic location indicator 902 and the geographic location indicator 436 of FIGS. 4 and 7 may be displayed in user-modifiable formats. The location number 904 may be a code to uniquely identify different facility locations of the business. The numeric classification code 906 and corresponding description 908 are populated with the selected instance of the numeric classification code 804 and the corresponding description 806 of FIG. 8.

An Add-to-List button 912 may be selected by a user to save any updates to data in fields 902-908 to a list 914, while a Cancel button 916 can prevent any changes to data in the fields 902-808 from being saved to the list 914. An Add New Class button 918 can add additional classification records to the list 914. Classification records in the list 914 can be edited and/or viewed using an Edit/View button 920. Classification records can be deleted from the list 914 using a Delete Class button 922. A Class Code Look Up button 924 may also be provided on the user input interface 901 to perform further classification code searches related to the numeric classification code 906, particularly when adding new classification records associated with a different job type or geographic location than was originally contemplated in the selections of FIGS. 4-8.

Figure 10:
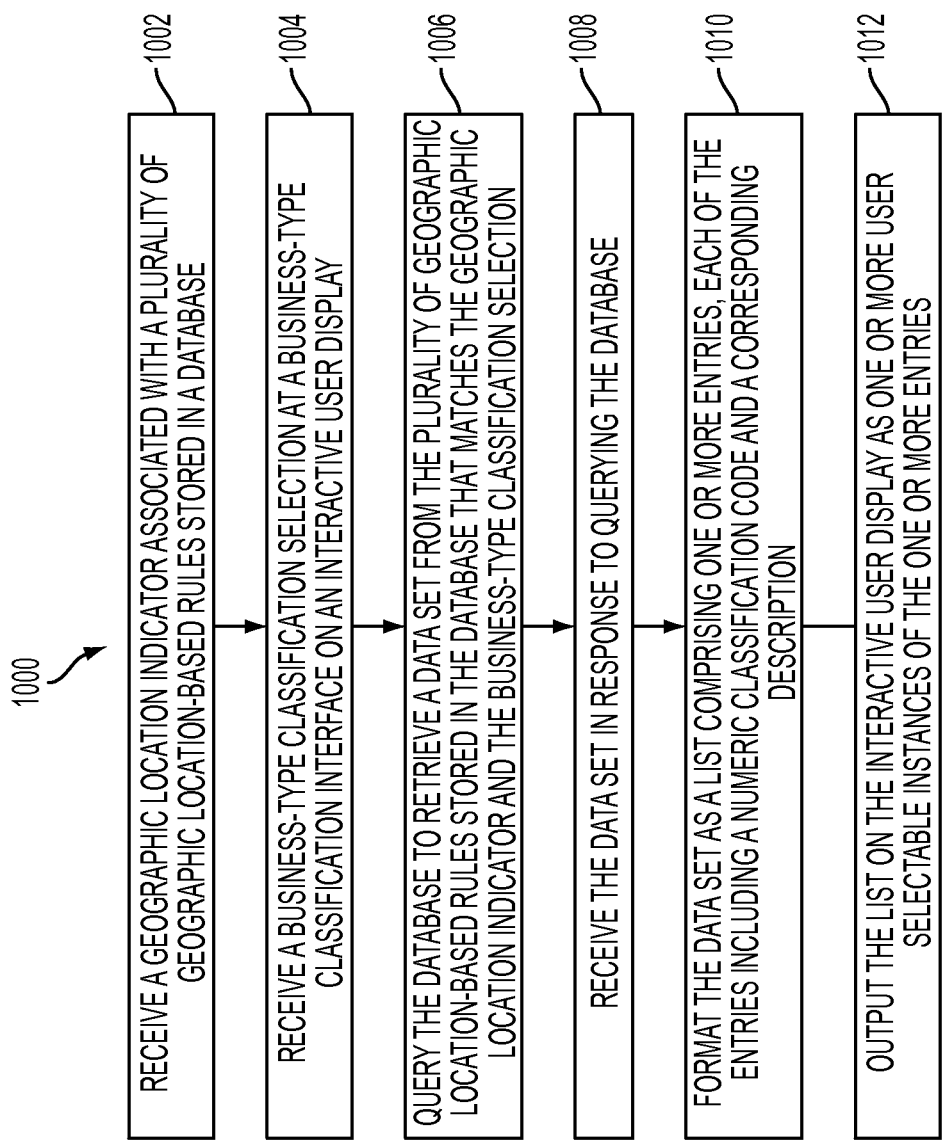
FIG. 10 depicts a process flow according to some embodiments of the present invention.

Turning now to FIG. 10, a process flow 1000 is depicted according to an embodiment. The process flow 1000 includes a number of steps that may be performed in the depicted sequence or in an alternate sequence. The process flow 1000 may be performed by the system 100 of FIG. 1. In one embodiment, the process flow 1000 is performed by the application server 102 of FIG. 1. In another embodiment, the process flow 1000 is performed by the user system 106 of FIG. 1.

At step 1002, a geographic location indicator associated with a plurality of geographic location-based rules stored in a database is received, such as the geographic location indicator 436 of FIGS. 4 and 7 associated with the location code 358 of the geographic location-based rules 370 of FIG. 3B from the database 111 of FIG. 1. The geographic location indicator 436 of FIGS. 4 and 7 may define a regulatory jurisdiction for workers compensation insurance coverage in the context of preparing an insurance policy.

At step 1004, a business-type classification selection is received at a business-type classification interface on an interactive user display. For example, with respect to FIG. 4, a business-type classification selection can be made as the business type classification 408 upon selecting the search button 412 on the classification portion 416 of the interactive user display 400 as a business-type classification interface on an interactive user display. The interactive user display 400, as well as other interactive user displays of FIGS. 1-9, may be generated by the application server 102 coupled to the mediation layer gateway 104 of FIG. 1.

At step 1006, the database is queried to retrieve a data set from the plurality of geographic location-based rules stored in the database that matches the geographic location indicator and the business-type classification selection, such as querying the database 111 of FIG. 1 to match the geographic location indicator 436 of FIG. 4 with a value of the location code 358 of the geographic location-based rules 370 of FIG. 3B and a value of the business-type classification data 320 of FIG. 3B. Various options for business-type classification queries can include: a keyword match of the brief classification description 312 and/or the extended classification description 314 of FIG. 3B; an industry segment match of the industry code 304 and/or the industry segment descriptions 334 of FIG. 3B; a SIC match with the SIC code 308, the SIC descriptions 338, and/or the SIC extended descriptions 340 of FIG. 3B; a NAICS match with the NAICS code 310, the NAICS descriptions 344, and/or the NAICS extended descriptions 346 of FIG. 3B; a program code match with the program code 306 of FIG. 3B; and other options that will be apparent to one skilled in the art. Further limiting of the data set can be performed by adding more terms to the query, such as an effective date based on the policy effective date 402 of FIG. 4, where the data set received in response to the query may be filtered based on the effective date, e.g., with respect to the effective date 362 and/or expiration date 364 of FIG. 3B.

At step 1008, the data set is received in response to querying the database, which can include a number of fields from the tables 300, 326, 328, 330, 348, and/or 350 of FIG. 3A. The data set can be retrieved from the database 111 of FIG. 1 by the query processor 116 of FIG. 1 and passed through the mediation layer gateway 104 of FIG. 1 for further processing and display by the application server 102 and/or user system 106 of FIG. 1.

At step 1010, the data set is formatted as a list including one or more entries, where each of the entries includes a numeric classification code and a corresponding description. For instance, the data set can be formatted as the list 800 of FIG. 8 with one or more entries 802 including a numeric classification code 804 and corresponding description 806 per entry 802. The numeric classification code 804 and the corresponding description 806 of each of the entries 802 of FIG. 8 may define classifications for workers compensation insurance according to predefined rules of the regulatory jurisdiction identified by the geographic location indicator 436 of FIGS. 4 and 7.

At step 1012, the list is output on the interactive user display as one or more user selectable instances of the one or more entries. As depicted in FIG. 8, the list 800 may be output in a drop-down box for selection of one of the one or more entries 802 in the list 800. The pull-down 710 of FIGS. 7 and 8 can trigger displaying the list 800 in a user-selectable format using the selector 808. The list 800 can be modified to include a none-of-the-above option 810 to prevent population of a classification record 910 (FIG. 9) of a classification code interface based on selecting the none-of-the-above option 810 from the list 800. The selection of one of the one or more entries 802 in the list 800 can trigger prefilling of a classification record 910 (FIG. 9) of a classification code interface with a selected instance of the numeric classification code 804 and the corresponding description 806 of FIG. 8 as further described in reference to FIG. 11.

Figure 11:
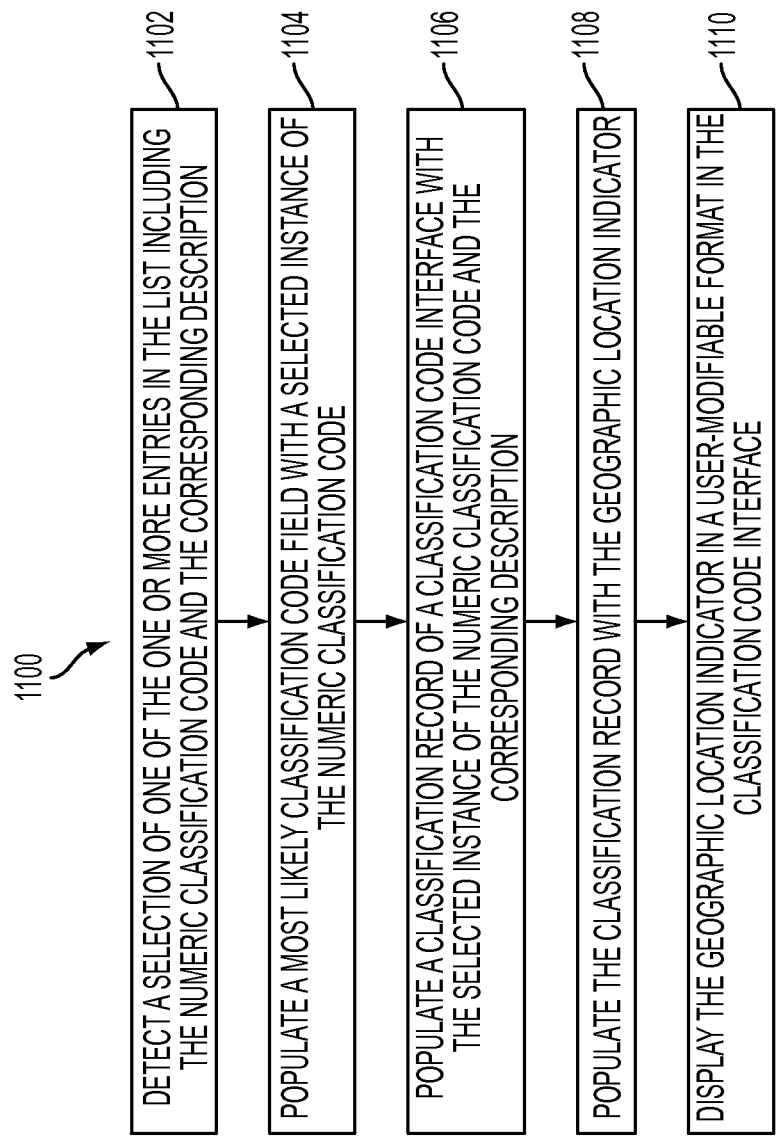
FIG. 11 depicts a process flow according to some embodiments of the present invention.

FIG. 11 depicts a process flow 1100 according to an embodiment. The process flow 1100 illustrates various steps that can be performed to enhance computer system performance by prepopulating a number of fields based on previously acquired data that reduces a number of additional searches needed when the suggested prefilled values are correct. At step 1102, a selection of one of the one or more entries 802 in the list 800 of FIG. 8 is detected, where the list 800 includes pairings of the numeric classification code 804 and the corresponding description 806 identified as part of the business-type classification searching of FIGS. 4-6. Selection in FIG. 8 can be performed using the selector 808 in combination with a user click event from the mouse 255 of FIG. 2 or pressing of an Enter key from the keyboard 250 of FIG. 2. At step 1104, a most likely classification code field 708 of FIG. 8 is populated with a selected instance of the numeric classification code 804 of FIG. 8. At step 1106, a classification record 910 of FIG. 9 of a classification code interface, such as user input interface 901 of FIG. 9, is populated with a selected instance of the numeric classification code 804 of FIG. 8 and the corresponding description 806 of FIG. 8 in the numeric classification code 906 and description 908 of FIG. 9 respectively. At step 1108, the classification record 910 is populated with the geographic location indicator 436 of FIGS. 4 and 7 in geographic location indicator 902 of FIG. 9. At step 1110, the geographic location indicator 902 of FIG. 9 is displayed in a user-modifiable format in the classification code interface, e.g., the user input interface 901 of FIG. 9.

Figure 12:
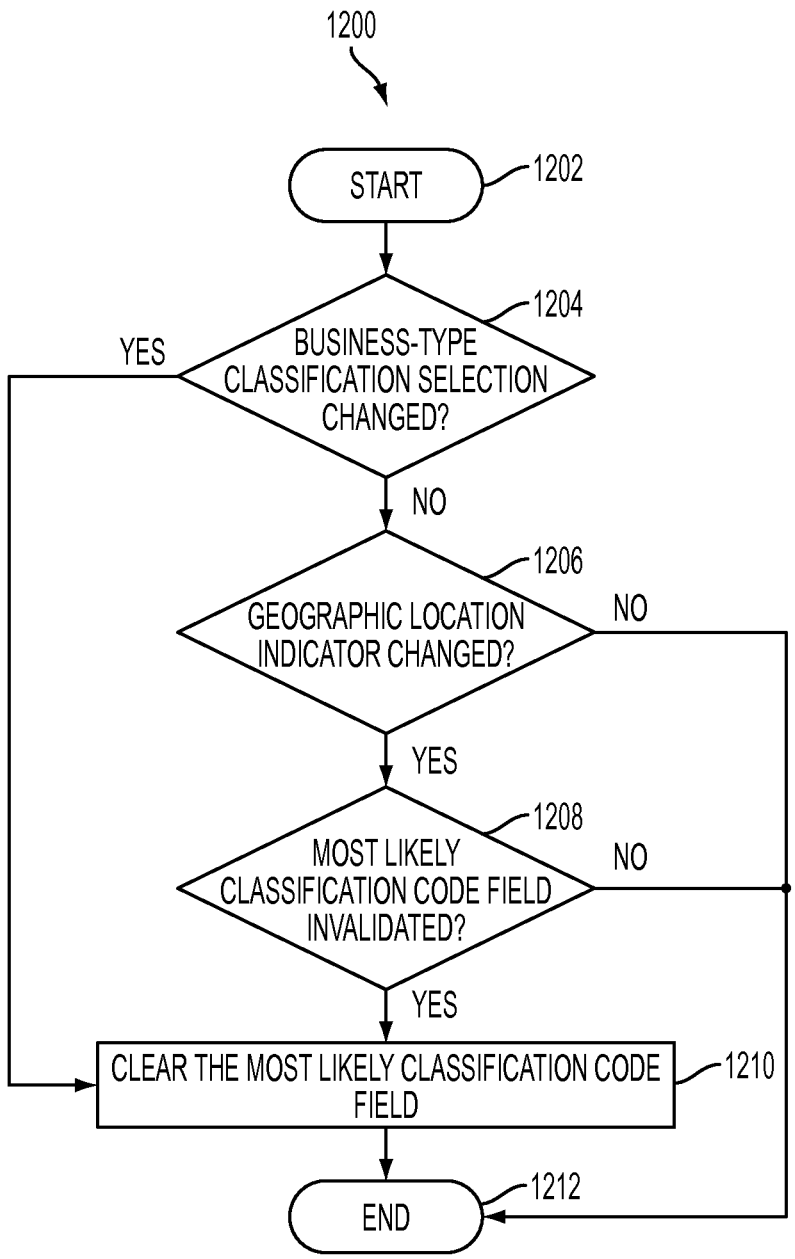
FIG. 12 depicts a process flow according to some embodiments of the present invention.

FIG. 12 depicts a process flow 1200 according to an embodiment. The process flow 1200 represents monitoring of various fields that may be performed on the user input interface 701 of FIGS. 7 and 8 and may be implemented by the DEA application 130 and/or the CCS application 132 of FIG. 1. Process flow 1200 begins a block 1202. At step 1204, it is determined whether the business-type classification selection has changed. For instance, the business type classification 408 of FIGS. 4, 7, and 8 may be modified to a different value. If the business-type classification selection has not changed, then at step 1206, it is determined whether the geographic location indicator has changed. For example, a user can modify a selected value of the state 432 of FIGS. 4 and 7, thereby changing the geographic location indicator 436 of FIGS. 4 and 7 upon which search results and other fields may depend. If the geographic location indicator has changed, then at step 1208, it is determined whether the most likely classification code field has been invalidated. For instance, if the definition of a numerical classification code reflected in the most likely classification code field 708 of FIGS. 7 and 8 changes when the geographic location indicator 436 of FIGS. 4 and 7 is changed, then the most likely classification code field 708 of FIGS. 7 and 8 is invalidated. If the most likely classification code field has been invalidated, at step 1210, the most likely classification code field is cleared, e.g., the most likely classification code field 708 of FIGS. 7 and 8 can be cleared. The process flow 1200 ends at block 1212 after step 1210.

Returning to step 1204, if the business-type classification selection has changed, then step 1210 is performed. For instance, if the value in the business type classification 408 of FIGS. 4, 7, and 8 has changed, then the most likely classification code field 708 of FIGS. 7 and 8 can be cleared to avoid a potential mismatch of a business-type and job classification code. If the geographic location indicator has not changed at step 1206 or the most likely classification code field has not been invalidated at step 1208, the process flow 1200 ends at block 1212. Thus, if there is no change detected to the geographic location indicator 436 of FIGS. 4 and 7, or the changed value uses the same definitions, then step 1210 can be avoided, as the most likely classification code field 708 of FIGS. 7 and 8 need not be cleared at this time.

It will be appreciated that aspects of the present invention may be embodied as a system, method, or computer program product and may take the form of a hardware embodiment, a software embodiment (including firmware, resident software, micro-code, etc.), or a combination thereof. Furthermore, aspects of the present invention may take the form of a computer program product embodied in one or more computer readable medium(s) having computer readable program code embodied thereon.

One or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In one aspect, the computer readable storage medium may be a tangible medium containing or storing a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

The computer readable medium may contain program code embodied thereon, which may be transmitted using any appropriate medium, including but not limited to wireless, wireline, optical fiber cable, RF, etc., or any suitable combination of the foregoing. In addition, computer program code for carrying out operations for implementing aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server.

It will be appreciated that aspects of the present invention are described herein with reference to flowchart illustrations and/or block diagrams of methods, apparatus (systems) and computer program products according to embodiments of the invention. It will be understood that each block or step of the flowchart illustrations and/or block diagrams, and combinations of blocks or steps in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately and/or specially-programmed general purpose computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" generally means any one or more microprocessors, CPU devices, computing devices, microcontrollers, digital signal processors, or like devices, as further described herein.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

What is claimed is:

1. A system, comprising:
    a processing device; and
    a memory device in communication with the processing device, the memory device storing instructions that when executed by the processing device result in:
        receiving a geographic location indicator associated with a plurality of geographic location-based rules stored in a database accessible through a query server;
        prompting a user to enter a business type classification selection at a business-type classification interface on a first interactive user display;
        performing a first query of the database through the query server to retrieve a data set from the plurality of geographic location-based rules stored in the database that matches the geographic location indicator and the business-type classification selection based on receiving the business-type classification selection at the business-type classification interface on the interactive user display;
        receiving the data set from the query server in response to the first query of the database;
        prompting the user to enter a search description input and a search type selection on a second interactive user display based on no match identified in the data set for the business-type classification selection or an absence of receiving the business type classification selection prior to triggering the first query;

performing a second query of the database through the query server to retrieve the data set from the plurality of geographic location-based rules stored in the database that matches the geographic location indicator and the search description input for the search type selection based on receiving the search description input;

receiving the data set from the query server in response to the second query of the database;

extending the second interactive user display to include a confirmation pane with a confirmation request for the business type classification selection responsive to the second query;

expanding a classification portion of the first interactive user display based on detecting an affirmative response to the confirmation request for the business type classification selection at the second interactive user display;

formatting the data set as a list comprising one or more entries, each of the entries comprising a numeric classification code and a corresponding description;

outputting the list on the first interactive user display as one or more user selectable instances of the one or more entries; and populating one or more fields of the expanded classification portion of the first interactive user display based on detecting a selection of one of the one or more user selectable instances of the one or more entries.

2. The system of claim 1, further comprising instructions that when executed by the processing device result in:

detecting the selection of one of the one or more entries in the list comprising the numeric classification code and the corresponding description; and populating a most likely classification code field of the expanded classification portion of the first interactive user display with a selected instance of the numeric classification code.

3. The system of claim 2, further comprising instructions that when executed by the processing device result in:

populating a classification record of a classification code interface with the selected instance of the numeric classification code and the corresponding description.

4. The system of claim 3, further comprising instructions that when executed by the processing device result in:

populating the classification record with the geographic location indicator; and displaying the geographic location indicator in a user-modifiable format in the classification code interface.

5. The system of claim 2, further comprising instructions that when executed by the processing device result in:

detecting a change in the business-type classification selection; and clearing the most likely classification code field based on the detected change in the business-type classification selection.

6. The system of claim 2, further comprising instructions that when executed by the processing device result in:

detecting a change in the geographic location indicator;

determining whether the change in the geographic location indicator invalidates the most likely classification code field; and clearing the most likely classification code field based on the invalidation of the most likely classification code field.

7. The system of claim 1, further comprising instructions that when executed by the processing device result in:

modifying the list to include a none-of-the-above option to prevent population of a classification record of a classification code interface based on selecting the none-of-the-above option from the list.

8. The system of claim 1, wherein the list is output in a drop-down box for selection of one of the one or more entries in the list, and wherein the selection of one of the one or more entries in the list triggers prefilling of a classification record of a classification code interface with a selected instance of the numeric classification code and the corresponding description.

9. The system of claim 1, wherein the first query or the second query further comprises an effective date, and wherein the data set received in response to the first query or the second query is filtered based on the effective date.

10. The system of claim 1, wherein the geographic location indicator defines a regulatory jurisdiction for workers compensation insurance coverage, and wherein the numeric classification code and the corresponding description of each of the entries define classifications for workers compensation insurance according to predefined rules of the regulatory jurisdiction.

11. The system of claim 1, wherein the first interactive user display and the second interactive user display are generated by an application server coupled to a mediation layer gateway, and wherein the data set is retrieved from the database by a query processor and passed through the mediation layer gateway.

12. A computer program product comprising a storage medium embodied with computer program instructions that when executed by a computer cause the computer to implement:

receiving a geographic location indicator associated with a plurality of geographic location-based rules stored in a database accessible through a query server;

prompting a user to enter a business type classification selection at a business-type classification interface on a first interactive user display;

performing a first query of the database through the query server to retrieve a data set from the plurality of geographic location-based rules stored in the database that matches the geographic location indicator and the business-type classification selection based on receiving the business-type classification selection at the business-type classification interface on the interactive user display;

receiving the data set from the query server in response to the first query of the database;

prompting the user to enter a search description input and a search type selection on a second interactive user display based on no match identified in the data set for the business-type classification selection or an absence of receiving the business type classification selection prior to the triggering to first query;

performing a second query of the database through the query server to retrieve the data set from the plurality of geographic location-based rules stored in the database that matches the geographic location indicator and the search description input for the search type selection based on receiving the search description input;

receiving the data set from the query server in response to the second query of the database;

extending the second interactive user display to include a confirmation pane with a confirmation request for the business type classification selection responsive to the second query;

expanding a classification portion of the first interactive user display based on detecting an affirmative response to the confirmation request for the business type classification selection at the second interactive user display;

formatting the data set as a list comprising one or more entries, each of the entries comprising a numeric classification code and a corresponding description;

outputting the list on the first interactive user display as one or more user selectable instances of the one or more entries; and populating one or more fields of the expanded classification portion of the first interactive user display based on detecting a selection of one of the one or more user selectable instances of the one or more entries.

13. The computer program product of claim 12, further comprising computer program instructions that when executed by the computer cause the computer to implement:

detecting the selection of one of the one or more entries in the list comprising the numeric classification code and the corresponding description; and populating a most likely classification code field of the expanded classification portion of the first interactive user display with a selected instance of the numeric classification code.

14. The computer program product of claim 13, further comprising computer program instructions that when executed by the computer cause the computer to implement:

populating a classification record of a classification code interface with the selected instance of the numeric classification code and the corresponding description.

15. The computer program product of claim 14, further comprising computer program instructions that when executed by the computer cause the computer to implement:

populating the classification record with the geographic location indicator; and displaying the geographic location indicator in a user-modifiable format in the classification code interface.

16. The computer program product of claim 13, further comprising computer program instructions that when executed by the computer cause the computer to implement:

detecting a change in the business-type classification selection; and clearing the most likely classification code field based on the detected change in the business-type classification selection.

17. The computer program product of claim 13, further comprising computer program instructions that when executed by the computer cause the computer to implement:

detecting a change in the geographic location indicator;

determining whether the change in the geographic location indicator invalidates the most likely classification code field; and clearing the most likely classification code field based on the invalidation of the most likely classification code field.

18. The computer program product of claim 12, further comprising computer program instructions that when executed by the computer cause the computer to implement:

modifying the list to include a none-of-the-above option to prevent population of a classification record of a classification code interface based on selecting the none-of-the-above option from the list.

19. The computer program product of claim 12, wherein the list is output in a drop-down box for selection of one of the one or more entries in the list, and wherein the selection of one of the one or more entries in the list triggers prefilling of a classification record of a classification code interface with a selected instance of the numeric classification code and the corresponding description.

20. The computer program product of claim 12, wherein the first query or the second query further comprises an effective date, and wherein the data set received in response to the first query or the second query is filtered based on the effective date.

21. The computer program product of claim 12, wherein the geographic location indicator defines a regulatory jurisdiction for workers compensation insurance coverage, and wherein the numeric classification code and the corresponding description of each of the entries define classifications for workers compensation insurance according to predefined rules of the regulatory jurisdiction.

22. The computer program product of claim 12, wherein the first interactive user display and the second interactive user display are generated by an application server coupled to a mediation layer gateway, and wherein the data set is retrieved from the database by a query processor and passed through the mediation layer gateway.

* * * * *